US011393036B2

(12) United States Patent
Wang et al.

(10) Patent No.: US 11,393,036 B2
(45) Date of Patent: Jul. 19, 2022

(54) DEEP LEARNING-BASED TWO-PHASE CLUSTERING ALGORITHM

(71) Applicant: S&P Global Inc., New York, NY (US)

(72) Inventors: Chong Wang, Queens, NY (US); Lisa Kim, Jersey City, NY (US); Grace Bang, New York, NY (US); Himani Singh, Brooklyn, NY (US); Russell Kociuba, Rochester, NY (US); Steven Pomerville, Rochester, NY (US); Xiaomo Liu, Queens, NY (US)

(73) Assignee: S&P Global Inc., New York, NY (US)

( * ) Notice: Subject to any disclaimer, the term of this patent is extended or adjusted under 35 U.S.C. 154(b) by 283 days.

(21) Appl. No.: 16/779,363

(22) Filed: Jan. 31, 2020

(65) Prior Publication Data

US 2021/0109954 A1    Apr. 15, 2021

Related U.S. Application Data

(60) Provisional application No. 62/913,885, filed on Oct. 11, 2019.

(51) Int. Cl.
*G06Q 40/06* (2012.01)
*G06Q 20/12* (2012.01)
(Continued)

(52) U.S. Cl.
CPC ....... *G06Q 40/06* (2013.01); *G06F 16/24556* (2019.01); *G06F 16/24578* (2019.01); *G06F 16/287* (2019.01); *G06F 16/906* (2019.01); *G06F 16/9038* (2019.01); *G06F 16/90332* (2019.01); *G06F 16/951* (2019.01); *G06F 16/9535* (2019.01); *G06F 40/205* (2020.01);

*G06F 40/289* (2020.01); *G06F 40/295* (2020.01); *G06N 3/08* (2013.01);
(Continued)

(58) Field of Classification Search
CPC ............ G06F 16/355; G06F 16/24556; G06F 16/24578; G06F 16/9038; G06F 16/90332; G06F 16/951; G06F 16/9535; G06F 16/906; G06F 16/287; G06F 40/205; G06F 40/295; G06F 40/289
See application file for complete search history.

(56) References Cited

U.S. PATENT DOCUMENTS 9,276,956 B2 * 3/2016 Geng ...................... G06F 21/55
9,785,699 B2 * 10/2017 Gupta ................. G06F 16/5838
(Continued)

FOREIGN PATENT DOCUMENTS

CA           2727961 A1    12/2009

OTHER PUBLICATIONS

Office Action dated Nov. 17, 2021 regarding U.S. Appl. No. 16/939,821; 30 pages.
(Continued)

*Primary Examiner* — Etienne P Leroux
(74) *Attorney, Agent, or Firm* — Yee & Associates, P.C.

(57) ABSTRACT

A framework for an automated news recommendation system system for financial analysis. The system includes the automated ingestion, relevancy, clustering, and ranking of news events for financial analysts in the capital markets. The framework is adaptable to any form of input news data and can seamlessly integrate with other data used for analysis like financial data.

33 Claims, 12 Drawing Sheets

(51) Int. Cl.

| | |
|---|---|
| *G06Q 30/02* | (2012.01) |
| *G06F 16/9535* | (2019.01) |
| *G06F 16/2457* | (2019.01) |
| *G06N 20/00* | (2019.01) |
| *G06F 40/289* | (2020.01) |
| *G06F 40/205* | (2020.01) |
| *G06F 16/951* | (2019.01) |
| *G06F 16/28* | (2019.01) |
| *G06F 16/2455* | (2019.01) |
| *G06F 40/295* | (2020.01) |
| *G06N 3/08* | (2006.01) |
| *G06F 16/906* | (2019.01) |
| *G06F 16/9038* | (2019.01) |
| *G06F 16/9032* | (2019.01) |
| *G06V 30/416* | (2022.01) |
| *H04L 67/01* | (2022.01) |

(52) U.S. Cl.
CPC ........... *G06N 20/00* (2019.01); *G06Q 20/127* (2013.01); *G06Q 30/0282* (2013.01); *G06V 30/416* (2022.01); *H04L 67/42* (2013.01)

(56) References Cited

U.S. PATENT DOCUMENTS

| | | | |
|---|---|---|---|
| 10,083,230 B2* | 9/2018 | Contractor | G06F 16/285 |
| 10,235,452 B1* | 3/2019 | Savir | G06F 16/35 |
| 10,496,691 B1* | 12/2019 | Chen | G06F 16/35 |
| 11,244,115 B2* | 2/2022 | Xu | G06K 9/6218 |
| 2005/0060312 A1 | 3/2005 | Curtiss et al. | |
| 2007/0265928 A1 | 11/2007 | Fuchs et al. | |
| 2008/0208847 A1 | 8/2008 | Moerchen et al. | |
| 2008/0301175 A1 | 12/2008 | Applebaum et al. | |
| 2010/0106568 A1 | 4/2010 | Grimes et al. | |
| 2012/0109966 A1 | 5/2012 | Liang et al. | |
| 2012/0207075 A1* | 8/2012 | Nagaraj | H04H 20/86 370/312 |
| 2012/0254188 A1 | 10/2012 | Koperski et al. | |
| 2012/0284275 A1 | 11/2012 | Vadrevu et al. | |
| 2014/0006403 A1* | 1/2014 | King | G06F 16/35 707/737 |
| 2014/0164352 A1 | 6/2014 | Denninghoff | |
| 2015/0046442 A1 | 2/2015 | Bannur et al. | |
| 2016/0004764 A1 | 1/2016 | Chakerian et al. | |
| 2016/0004820 A1 | 1/2016 | Moore | |
| 2016/0092581 A1* | 3/2016 | Joshi | G06F 16/9535 707/732 |
| 2016/0098404 A1* | 4/2016 | Rubenczyk | G06F 16/9535 707/728 |
| 2016/0188731 A1 | 6/2016 | Dai et al. | |
| 2016/0299989 A1* | 10/2016 | Trevisiol | G06F 16/00 |
| 2018/0032997 A1 | 2/2018 | Gordon et al. | |
| 2018/0067945 A1 | 3/2018 | Jain et al. | |
| 2018/0121555 A1* | 5/2018 | Li | G06F 9/547 |
| 2018/0124194 A1 | 5/2018 | Rajewski | |
| 2018/0196808 A1* | 7/2018 | Ho | G06F 16/9535 |
| 2018/0251230 A1* | 9/2018 | Chavez | B64C 13/044 |
| 2018/0260484 A1* | 9/2018 | Wang | G06F 16/9535 |
| 2019/0012374 A1* | 1/2019 | Petroni | G06F 16/90332 |
| 2019/0012387 A1 | 1/2019 | Li et al. | |
| 2019/0179861 A1 | 6/2019 | Goldenstein et al. | |
| 2019/0354800 A1 | 11/2019 | Yoo et al. | |
| 2020/0019870 A1* | 1/2020 | Stowell | G06F 40/221 |
| 2020/0301997 A1* | 9/2020 | Smith | G06N 7/023 |
| 2020/0401639 A1* | 12/2020 | Kussmaul | G06F 16/9535 |
| 2021/0034784 A1* | 2/2021 | Baughman | G06N 3/0454 |
| 2021/0109968 A1 | 4/2021 | Kim et al. | |
| 2021/0110475 A1 | 4/2021 | Singh et al. | |
| 2021/0117867 A1* | 4/2021 | Clifton | G06N 3/0454 |
| 2022/0027387 A1 | 1/2022 | Wang et al. | |

OTHER PUBLICATIONS

Office Action dated Feb. 18, 2022 regarding U.S. Appl. No. 16/779,434; 21 pages.

Office Action dated Feb. 15, 2022 regarding U.S. Appl. No. 16/779,305; 29 pages.

Final Office Action dated Feb. 22, 2022 regarding U.S. Appl. No. 16/939,821; 33 pages.

Notice of Allowance dated Apr. 26, 2022, regarding U.S. Appl. No. 16/779,305; 11 pages.

Notice of Allowance dated Mar. 16, 2022 regarding U.S. Appl. No. 16/779,434; 7 pages.

* cited by examiner

FIG. 5

| S&P Global Ratings | 500 | 🗁 Portfolio | 🔔 Notifications | 🗏 News | 📈 Market Data | 🗏 Filings | 🏛 Loan Docs | 👥 Peers | 👤 |

Headlines | Enter Company Name to Search | ✕

From Date | To Date
▦ | ▦ 9/5/2019

Items per page: 25 ▾ | 1 - 25 of 11361 |< < >

518 — Company A secures contract for Mainframe operating system software package | Sep 5, 2019/Today
520 — 🗐 Company A | 524 📩 ⁓ 526
522 — Description: Spain based Company A has secured contract from Company B for | 510 ✓
Mainframe operating system software package. Contract awarded to Company A. | 🗐 ⁓ 528

518 — Lenders accuse of overstepping mark with ban on payday loan apps | Sep 5, 2019/Today
520 — 🗐 Company C | 524 📩 ⁓ 526
522 — Loans that require repayment in full in 60 days or less, also referred to as pay-cheque | 512 ✓
advances or short term loans will soon be banned, has warned app developers in an | 🗐 ⁓ 528
email, said." It is disappointing to see take the decision to ban short-term loan apps. |
"We are not surprised because it does reflect an approach.... | View 3 More ⌄ — 530

518 — investigations pile up as US states prepare monopoly probe | Sep 5, 2019/Today
520 — 🗐 Company C | 524 📩 ⁓ 526
522 — faces further pressure over the dominance after multiple US states joined forces to investigate whether the | 514 ✓
company has behaved anti-competitively. The new probe again raises the prospect of fines, alternative business | 🗐 ⁓ 528
models for selling adverts or promoting services on its various products or websites, and in an extreme.... |

518 — Company D chief legal boss, accused of emotionally abusing a former after | Sep 5, 2019/Today
520 — 🗐 Company C | 524 📩 ⁓ 526
522 — a workplace affair, reportedly married a current employee over the weekend | 516 ✓
John Smith, senior vice president of corporate development and chief legal officer for parent | 🗐 ⁓ 528
company, Company D, married a current employee this past weekend, according to XYZ. |
The news comes about a week after Jane Doe published a scathing post accusing Smith of |
emotional abuse after the birth of the child they had together.... |

DEEP LEARNING-BASED TWO-PHASE CLUSTERING ALGORITHM

BACKGROUND INFORMATION

1. Field

The present disclosure relates generally to an improved computer system and, in particular, to a news recommendation system for financial analysis.

2. Background

Analysts in the financial services industry ingest news from dozens of sources every day. It is critical for them to stay up-to-date on the latest events as at any moment, key material events could occur that impact their analysis on a given company. For example, a company could announce an acquisition or a disruption to their supply chain that would materially impact its business operations. By staying informed on these events in a timely manner, analysts can promptly respond to these changing circumstances and potentially minimize any impact of the company's action on their investment holdings or analysis.

Currently, for each company they analyze, the analysts manually set up news alert subscriptions from a fixed set of sources based on keywords of the company's name. Thus, the news alerts analysts receive contain much noise. Also, a company with a name like "Fruit" could result in news alerts about fruit orchards or fruit juice. Or alternatively, if there are critical articles discussing changes in regulations of the smartphone industry but there are no explicit mentions of company names, this may not be picked up through the keyword-generated manual news alert. The lack of comprehensive coverage means the attention to certain critical news events can be delayed or missed altogether. Additionally, when a breaking news event occurs, dozens of media outlets report on the same occurrence which result in multiple alerts on the same event. Manual review of relevant and important news events is time-consuming and error-prone.

Currently, analysts receive news alerts through manually created news alert subscriptions that are often noisy and difficult to manage. The manual review process is time-consuming and error-prone. Therefore, many analysts rely on a news recommendation system for financial analysis, which can suggest important news articles that are relevant to financial analysts' tasks.

Early news recommendation systems used external ontologies to find interesting news articles. However, related knowledge bases do not always exist and are highly expensive to build. In the recent years, many news recommendation systems used collaborative filtering (CF) based methods, which performed effectively in movie and product recommendations, and also proposed CF-based news recommendation systems.

CF-based news recommendation systems capture user preference by user behavior, such as click, like, and repost. However, CF-based methods are not feasible in task-oriented news recommendation systems, especially in the finance industry. Recommending news similar to the ones in analysts' history may bias the system towards frequent events. However, financially interesting business events may be rare, such as bankruptcy and acquisition. In this case, once occurred, rare events have minimal chances to be surfaced.

Furthermore, in financial firms, one analyst is assigned to monitor a given company or several analysts may analyze different aspects of a company. In this case, diverse "user interests" generate highly sparse user-news interaction, which discounts the performance of the CF-based system.

Content-based recommendation is another commonly used technique. In the application of a news recommendation, most content-based methods build user profiles based on past reading history and calculate the similarity between an incoming news and each user profile. Similar to the CF-based methods, in task-oriented news recommendation systems, determining news relevancy based on the history of individual users may favor frequent business events than important but rare events.

Popularity-based recommendation systems monitor news popularity from social media such as Twitter. However, a task-oriented news system should not be impacted by the popularity on social media, since there is little correlation between these trending news stories and task-relevant business events.

Automated recommendation systems often do not take into account that substantially duplicate articles having similar content may be received from many different sources. In the systems, it is incumbent upon an analyst to manually identify updated or different information in articles that contain a majority of duplicated content.

Therefore, it would be desirable to have a method and apparatus that take into account at least some of the issues discussed above, as well as other possible issues. For example, it is desirable to build a news recommendation system for financial analysis, which can suggest important news articles that are both representative of important events and relevant to financial analysts' tasks. To be applied in large financial companies, a desirable news recommendation system should be 1) effective so that analysts will not miss any important information, 2) efficient so that news can be timely updated, 3) scalable so that it can be used in large business environments, and 4) extendable so that changing business requirements can easily be met.

SUMMARY

The illustrative embodiments described herein provide a framework for an automated news recommendation system for financial analysis. The system includes the automated ingestion, relevancy, clustering, and ranking of news events for financial analysts in the capital markets. The framework is adaptable to any form of input news data and can seamlessly integrate with other data used for analysis like financial data.

The illustrative embodiments described herein provide a methodology that uses a combination of entity-based news tracking, clustering, relevancy, and ranking models to detect news events, filter out noise, cluster the same event into each of the respective clusters, assign relevance of news event to main entity, and rank each news event cluster based on the importance of the event to the overall company. The ranked list of events are presented to the user in this curated manner which allows analysts to focus on key news relevant to their analysis and thus spend less time filtering through noise and reviewing redundant events. New business requirements can be easily added by defining new subscriptions with any customized entities. Processes within subscriptions can be fully paralleled.

The illustrative embodiments described herein provide (1) a full-stack systematic methodology of information retrieval and relevancy to automatically distinguish financially material news events, and (2) a generic, scalable, and extendable news recommendation framework that can be easily adopted by most financial companies. The news recommendation system of the illustrative embodiments is able to detect emerging risks to company's operations faster and more efficiently than current analyst methods.

The illustrative embodiments described herein provide a news recommendation system that offers several advantages over prior art systems that allow financial analysts to work more effectively and efficiently. The news recommendation system described herein presents a full stack financial news recommendation system from data storage to user interface that can be easily deployed at any financial company. With a subscription-based pipeline, the system can be conveniently parallelized and extended for new business monitoring requirements. By using a series of clustering and relevancy models, the system is able to recommend news events that have a direct relevancy to the final outcome of analysis, e.g., credit rating, at a financial firm.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 5 is a graphical user interface of a news recommendation system in accordance with an illustrative embodiment;

DETAILED DESCRIPTION

Figure 1:
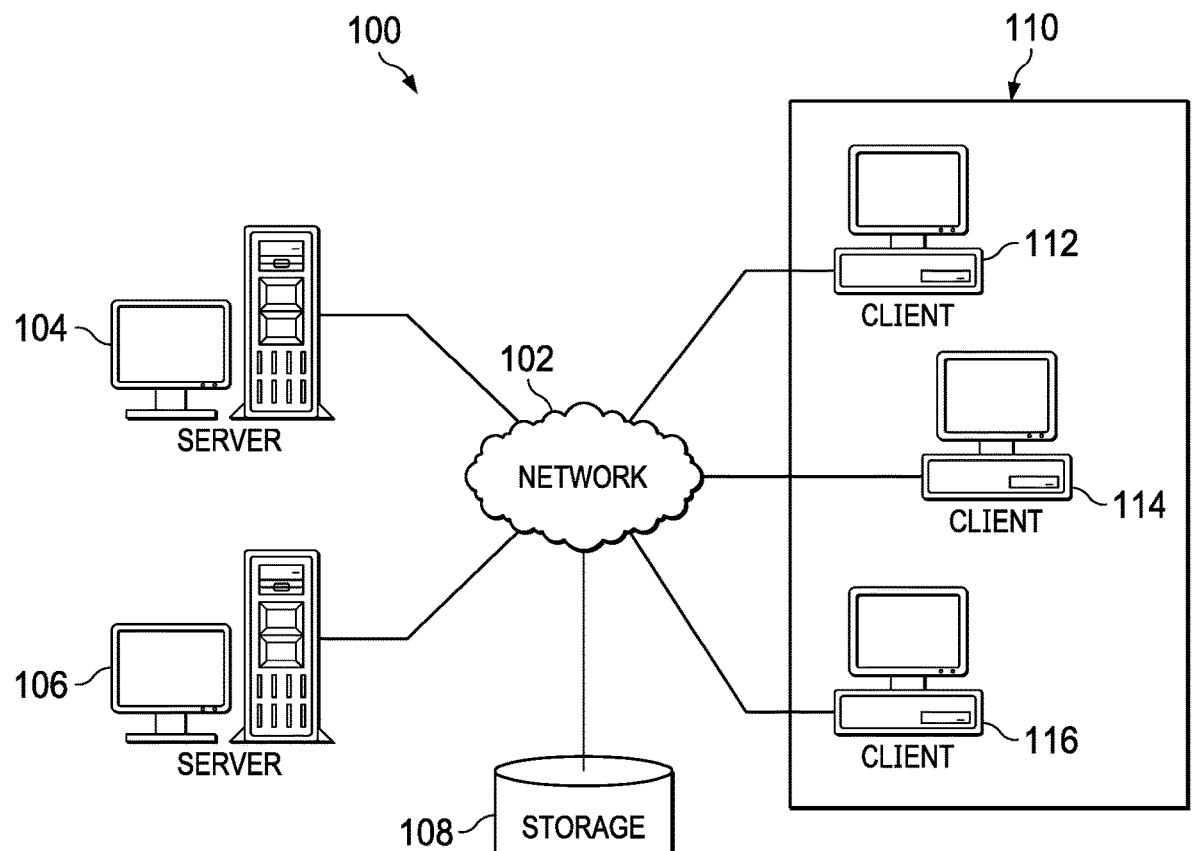
FIG. 1 is a pictorial representation of a network of data processing systems in which illustrative embodiments may be implemented.

The illustrative embodiments recognize and take into account one or more different considerations. For example, the illustrative embodiments recognize and take into account that it is desirable to build a news recommendation system for financial analysis, which can suggest important news articles that are relevant to financial analysts' tasks.

The illustrative embodiments recognize and take into account that identifying the relevance of the news event to the analytical assessment of a company is a complex process that is often noisy and difficult to manage. For example, certain topics like a management turnover could be breaking news but may not be impactful to the company's rating and thus not highly relevant for analysts. Additionally, for example, if company A engages in an activity in partnership with company B, if the activity were to primarily impact company A and only tangentially impact company B, the news event would not be as relevant for analysts covering company B.

The illustrative embodiments recognize and take into account that material news events should impact the future performance of the company in a sustained and meaningful way. For example, the credit rating of a company is a one to two year forward-looking assessment of the company's performance. This nuanced definition of a credit rating impacts the approach required to assess the relevance of the news events to the end user.

The illustrative embodiments further recognize and take into account that a news recommendation system should be 1) effective so that analysts will not miss any important information, 2) efficient so that news can be timely updated, 3) scalable so that it can be used in large business environments, and 4) extendable so that changing business requirements can easily be met.

The illustrative embodiments described herein provide a framework for an automated news recommendation system for financial analysis. The system includes the automated ingestion, relevancy, clustering, and ranking of news events for financial analysts in the capital markets. The framework is adaptable to any form of input news data and can seamlessly integrate with other data used for analysis like financial data.

The illustrative embodiments provide a methodology that uses a combination of entity-based news tracking, clustering, relevancy, and ranking models to detect news events, filter out noise, cluster the same event into each of the respective clusters, assign relevance of news events to a main entity, and rank each news event cluster based on the importance of the event to the overall company. The ranked list of events are presented to the user in this curated manner which allows analysts to focus on key news relevant to their analysis and thus spend less time filtering through noise and reviewing redundant events. New business requirements can be easily added by defining new subscriptions with any customized entities. Processes within subscriptions can be fully paralleled.

The illustrative embodiments provide (1) a full-stack systematic methodology of information retrieval and relevancy to automatically distinguish financially material news events, and (2) a generic, scalable, and extendable news recommendation framework that can be easily adopted by most financial companies. The news recommendation system of the illustrative embodiments is able to detect emerging risks to a company's operations faster and more efficiently than current analyst methods.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as a mobile phone, a tablet computer, and smart glasses. In this illustrative example, server computer 104, server computer 106, storage unit 108, and client devices 110 are network devices that connect to network 102 in which network 102 is the communications media for these network devices. Some or all of client devices 110 may form an Internet-of-things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Figure 2:
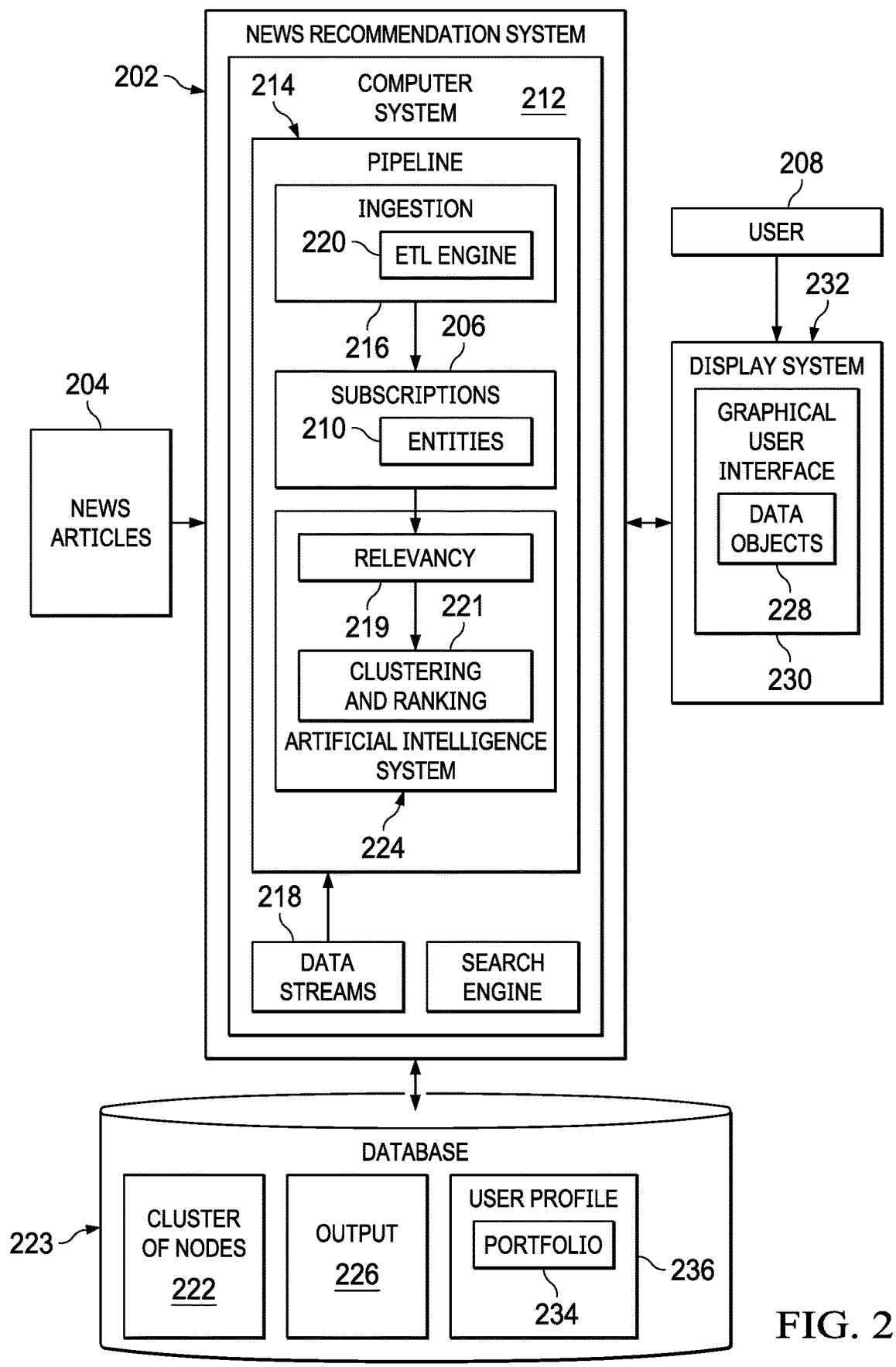
FIG. 2 is a block diagram of a news recommendation environment in accordance with an illustrative embodiment.

With reference now to FIG. 2, news processing environment 200 includes components that can be implemented in hardware such as the hardware shown in network data processing system 100 in FIG. 1.

In this illustrative example, news recommendation system 202 operates to process and recommend news articles 204 based on subscriptions 206 of user 208 to different entities 210. Entities 210 are categorical descriptors with which news articles 204 may be associated. For example, entities 210 can be a company name, a geolocation, and a topic, as well as other relevant categorical descriptors with which news articles 204 may be associated.

In this illustrative example, news recommendation system 202 is located in computer system 212. Computer system 212 is a physical hardware system and includes one or more data processing systems. When more than one data processing system is present in computer system 212, those data processing systems are in communication with each other using a communications medium. The communications medium may be a network. The data processing systems may be selected from at least one of a computer, a server computer, a tablet, or some other suitable data processing system.

News recommendation system 202 can be implemented in software, hardware, firmware, or a combination thereof. When software is used, the operations performed by news recommendation system 202 can be implemented in program code configured to run on hardware, such as a processor unit. When firmware is used, the operations performed by news recommendation system 202 can be implemented in program code and data and stored in persistent memory to run on a processor unit. When hardware is employed, the hardware may include circuits that operate to perform the operations in news recommendation system 202.

In the illustrative examples, the hardware may take a form selected from at least one of a circuit system, an integrated circuit, an application-specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

News recommendation system 202 includes a subscription-based pipeline 214 that recommends relevant ones of news articles 204 based on subscriptions 206 designated by user 208. Pipeline 214 can include a number of different components. As depicted, pipeline 214 includes ingestion 216, subscription 206, relevancy 219, and clustering and ranking 221.

During ingestion 216 of data, news recommendation system 202 integrates heterogeneous data streams 218 from a number of different news sources. Ingestion 216 provides an extract, transform, load (ETL) engine 220 that provides centralized data collection, processing and enrichment of data from one or more of data streams 218. Data collected from the above sources is stored in database 223. In this illustrative example, database 223 can be a NoSQL database that uses cluster of nodes 222 for storage.

In one illustrative example, ingestion 216 parses and indexes data streams 218, as the dataset can be large, dynamic, and requires fast retrieval. In one illustrative example, ingestion 216 is implemented as an integrated service, such as Elastic Stack, which automatically detects and adds new fields when required.

News recommendation system 202 distributes news articles 204 into different ones of subscriptions 206. In one illustrative example, news articles 204 are distributed into different ones of subscriptions 206, providing a query context for the different entities 210.

Each ones of entities 210 corresponds to a separate one of subscriptions 206 to which a user may subscribe. In one illustrative example, entities 210 can designated by keywords, such as person names, organization names, place names, event names, and natural disasters, as well as other suitable keywords. All of news articles 204 talking about a particular entity, e.g. Fruit Co., Inc., are assigned into the corresponding one of subscriptions 206. News articles 204 may be relevant to one or more of entities 210. Thus, news articles 204 may be distributed to multiple ones of subscriptions 206. New business requirements can be met by creating new types of subscriptions and/or adding more subscriptions.

In this illustrative example, artificial intelligence system 224 can be used to recommend more news articles 204 as compared to known news recommendation systems.

An artificial intelligence system is a system that has intelligent behavior and can be based on the function of a human brain. An artificial intelligence system comprises at least one of an artificial neural network, an artificial neural network with natural language processing, a cognitive system, a Bayesian network, a fuzzy logic, an expert system, a natural language system, a cognitive system, or some other suitable system.

Machine learning is used to train the artificial intelligence system. Machine learning involves inputting data to the process and allowing the process to adjust and improve the function of the artificial intelligence system. In this illustrative example, training of artificial intelligence system 224 can be performed using a set of machine learning algorithms. The set of machine learning algorithms can be machine learning algorithms that are selected from at least one of supervised learning, unsupervised learning, reinforcement learning, or other suitable types of machine learning algorithms.

In this illustrative example, supervised learning comprises providing the artificial intelligence machine model with training data and the correct output value of the data. During supervised learning, the values for the output are provided along with the training data (labeled dataset) for the model building process. The algorithm, through trial and error, deciphers the patterns that exist between the input training data and the known output values to create an artificial intelligence model that can reproduce the same underlying rules with new data.

Examples of supervised learning algorithms include regression analysis, decision trees, k-nearest neighbors, neural networks, and support vector machines. Another example of a supervised learning algorithm that can be used to train artificial intelligence models is Named Entity Recognition (NER), Deep Neural Network Classification.

If unsupervised learning is used, not all of the variables and data patterns are labeled, forcing the artificial intelligence machine model to discover hidden patterns and create labels on its own through the use of unsupervised learning algorithms. Unsupervised learning has the advantage of discovering patterns in the data with no need for labeled datasets. Examples of algorithms used in unsupervised machine learning include k-means clustering, association analysis, and descending clustering.

Whereas supervised learning and unsupervised learning learn from a dataset, reinforcement learning learns from interactions with an environment. Algorithms such as Q-learning are used to train the predictive model through interacting with the environment using measurable performance criteria.

News recommendation system 202 uses artificial intelligence system 224 to determine relevancy 219. Relevancy 219 can include a de-duplication to remove duplicate news articles 204 in each subscription. Identifying duplicate news helps to remove noise, improve the cluster importance estimation, and speed up the whole pipeline. For example, some news sources copy and re-post news from an original source with little changes. Furthermore, a news source may produce updated versions of news with minor changes. De-duplication can reduce these duplicate news articles by detecting and only keeping the latest one.

It is common that, although an entity (e.g., a company or a city) is mentioned in a news article, it is not the focus of the article. Relevancy 219 can apply a news entity model to identify the relevance of an article to an associated entity and remove irrelevant news.

News published by larger news sources (i.e., publishers) tend to be more credible and accurate. Larger news sources are more influential to the financial market and investors. Relevancy 219 can filter news by news sources in order to further refine the news candidate sets.

Often times, news events that can potentially impact credit rating activities are implicit and mostly determined by analysts' knowledge and interpretation of the events. Hence, relevancy 219 can apply a set of models to identify or score a news topic relevance for news articles 204 that could impact their analysis.

News recommendation system 202 uses artificial intelligence system 224 to determine clustering and ranking 221. As big news events may be reported by many news sources, the size of a news cluster can indicate the event noteworthiness, signaling the event importance. Furthermore, grouping news on the same events improves user browsing experience as analysts do not have to manually skip over similar news in the application.

In one illustrative example, clustering and ranking 221 rank both clusters and news in each cluster. Important clusters rank higher (i.e., cluster-level ranking), with each cluster showing the most representative news for each cluster (i.e., news-level ranking).

News recommendation system 202 stores output 226 of clustering and ranking 221 in database 223.

In this illustrative example, database 223 can be a relational database, enabling news recommendation system 202 to maintain the atomicity of operations on database 202 and to comply with integrity requirements both in data type and compatibility for the services layer. The relational database stores the relationship between clusters, news stories, and user subscriptions to create data objects 228 for graphical user interface 230.

In one illustrative example, each cluster of news articles is represented as a different one of data objects 228 displayed in graphical user interface 230. Graphical user interface 230 displays data objects 228 according to the output of clustering and ranking 221, ensuring that important news events do not get buried in the interface. Important ranking clusters are displayed higher in graphical user interface 230 relative to lower ranking clusters (i.e., cluster-level ranking).

By default, each one of data objects 228 displays the representative news for the corresponding cluster. The representative news of a cluster is the top-ranked news in the cluster. Each one of data objects 228 is therefore displayed within graphical user interface 230 showing the most representative news for each cluster (i.e., news-level ranking) can be presented with graphical user interface 230 with titles, entity names, descriptions, and publication dates.

In one illustrative example, each one of data objects 228 is a control element within graphical user interface 230. As used herein, a control is a graphical and/or functional element that can be reused across graphical user interface (GUI) applications and which the user can select and activate to get additional information. A control, in a graphical user interface, is an object on the screen that can be manipulated by the user to perform some action. In this illustrative example, user 208 can interact with data objects 228 to unfold additional news articles in that cluster for display in graphical user interface 230.

User 208 interacts with news recommendation system 202 through user input to graphical user interface 230 using one or more user input devices, such as a keyboard, a mouse, a graphical user interface (a physical display), a touch screen, a voice interaction, and any other suitable interface for interacting with the computer.

In one illustrative example, a client device, such as one of client devices 110 of FIG. 1, displays graphical user interface 230 on display system 232. In this illustrative example, display system 232 can be a group of display devices. A display device in display system 232 may be selected from one of a liquid crystal display (LCD), a light emitting diode (LED) display, an organic light emitting diode (OLED) display, and other suitable types of display devices.

In one illustrative example, subscriptions 206 of user 208 are stored as portfolio 234 in conjunction with user profile 236. By default, user 208 receives news of subscriptions 206 in portfolio 234. When user 208 logs on, graphical user interface 230 will bring up and rank all news articles corresponding to subscriptions 206 in portfolio 234. News recommendation system 202 allows user 208 to create and follow additional subscriptions, enabling user 208 to have a variety of entities 210 indicated in portfolio 234, and thereby to follow different topics and companies based on subscriptions 206.

In one illustrative example, one or more technical solutions are present that overcome a technical problem with currently available news recommendation systems. As a result, one or more technical solutions may provide a technical effect of enabling an artificial intelligence system to recommend relevant news articles with greater accuracy as compared to current news recommendation systems.

Computer system 212 can be configured to perform at least one of the steps, operations, or actions described in the different illustrative examples using software, hardware, firmware, or a combination thereof. As a result, computer system 212 operates as a special purpose computer system in which pipeline 214 in computer system 212 enables artificial intelligence system 224 to process news articles 204. In particular, pipeline 214 transforms computer system 212 into a special purpose computer system as compared to currently available general computer systems that do not have pipeline 214.

In the illustrative example, the use of pipeline 214 in computer system 212 integrates processes into a practical application for a method of recommending news articles 204 that increases the performance of computer system 212. In other words, pipeline 214 in computer system 210 is directed towards a practical application of processes integrated into pipeline 214 in computer system 212 that identifies relevant news articles based on users subscriptions to different entities.

In this illustrative example, pipeline 214 in computer system 212 utilizes one or more machine learning algorithms in a manner that results in an artificial intelligence system that is capable of processing news articles, and generating recommendations with a desired level of accuracy. In this manner, pipeline 214 in computer system 212 provides a practical application of a method to process news articles and generate recommendations such that the functioning of computer system 210 is improved.

Figure 3:
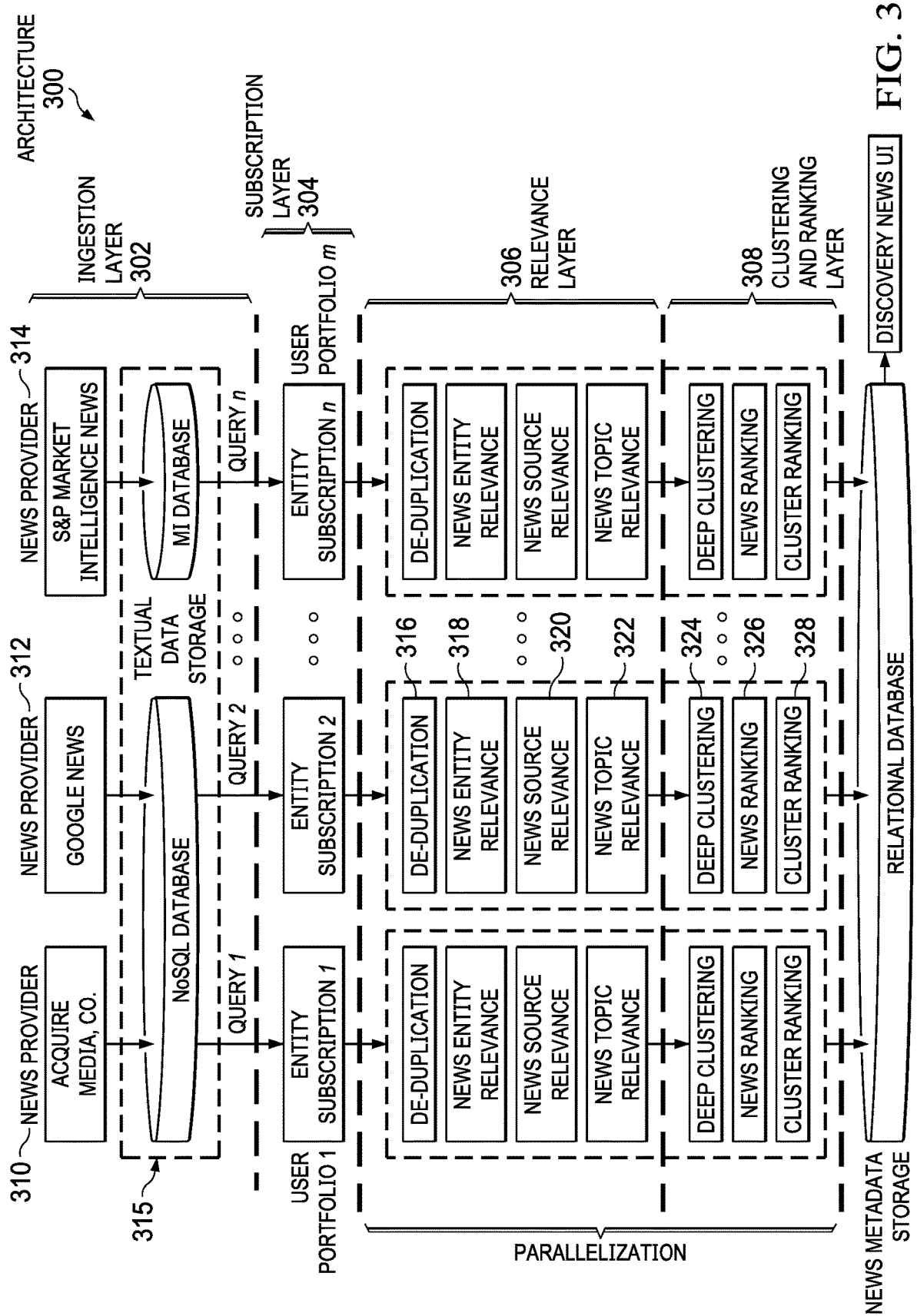
FIG. 3 is an architecture of a news recommendation system in in accordance with an illustrative embodiment.

FIG. 3 is an illustration of an architecture of a news recommendation system in which illustrative embodiments can be implemented. Architecture 300 is an exemplary architecture of news recommendation system 200, shown in FIG. 2.

The pipeline of architecture 300 can be provided as an offline process that is scheduled to run at designated intervals, such as daily, hourly, etc., from ingestion to news result generation. Due in part to parallel processing described herein, the system scales horizontally, taking about 15 minutes to process 1,500 subscriptions, and less than 45 minutes for nearly 5,000 subscriptions, wherein running on an Amazon AWS web server, news can be more timely updated as the pipeline is kicked off more frequently.

Architecture 300 includes ingestion layer 302, subscription layer 304, relevance layer 306, and clustering and ranking layer 308.

Ingestion layer 302 integrates heterogeneous data streams from multiple different news providers. Without loss of generality, the presented framework can integrate data from any data provider.

In one illustrative example, the different news providers can include news provider 310. In this illustrative example, news provider 310 is a third party company that provides a news management and delivery solution for publishing and financial services. Data from news provider 310 may be published in XML format, wherein each XML contains information on a news article, such as title, content, and source. In this illustrative example, news provider 310 may be Acquire Media Co., delivering about 60,000 daily news articles published by more than 10,000 global sources.

In one illustrative example, the different news providers can include news provider 312. In this illustrative example, news provider 312 is a publicly available news aggregator that uses its own algorithms to collect news related to different keywords. Each entity of interest is set up as keywords in news provider 312 as a feed. Ingestion layer 302 may include a crawler that is scheduled to download news from all feeds. In this illustrative example, news provider 310 may be Google News, developed by Alphabet Inc.

In one illustrative example, the different news providers can include news provider 314. In this illustrative example, news provider 314 is a third-party news provider that delivers curated news with an emphasis on analysis rather than reported news. The news distributed through news provider 314 focus on offering insights to end users. In this illustrative example, news provider 314 may be S&P Market Intelligence (MI) News.

Data collected from the above sources is stored into NoSQL database 315 as a cluster of nodes for storage. The parsed data is directly inserted to Elasticsearch which automatically detects and adds new fields when required. Architecture 300 uses different compound queries to prepare the data, distributing the news articles into subscriptions.

Processes in each subscription are independent of each other. After news articles are distributed into subscriptions, all subsequent processes are conducted within each subscription.

In one illustrative example, the pipeline adopts multiprocessing to process subscriptions simultaneously. Subscriptions are assigned and processed on different CPUs. Since subscriptions may have different numbers of news articles, load-balancing can be employed to guarantee that the CPUs get a balanced workload. The same parallelization design can be applied on Hadoop clusters due to the independence among subscriptions.

In one illustrative example, load-balancing is performed using a greedy algorithm. Algorithm 1 provides pseudocode for an illustrative subscription allocation algorithm that in a minimum heap that contains subscriptions allocated to each CPU:

---

Algorithm 1: Subscription Allocation Algorithm minimum Heap H ← ∅;
j ← 0;
while j < #CPUs do
    |   $S'_j$ ← ∅ // store allocated subscriptions;
    |   push(H, $S'_j$, [0, j]) // 0 is #news m in jth CPU;
    |   j ← j + 1;
end
i ← 0;
while i < n do

---

Algorithm 1: Subscription Allocation Algorithm

|   m, $S'_j$, j ← pop (H) // jth CPU with the least #news;
    |   push (H; [m + $|s_i|$, $S'_j \cup \{s_i\}$, j]
    |   i ← i + 1;
end

---

Wherein:
Subscriptions S={$s_1, s_2, \ldots, s_n$}; and $|s_i|$ is denoted as the number of news in $s_i$.

Relevance layer 306 includes de-duplication 316. Because re-posted news may be modified slightly (e.g., adding the re-posting news source name), simply comparing if news articles are the same causes low recall. To enable near duplicate detection, de-duplication 316 implements a Support Vector Machine (SVM) fed by the Local Sensitive Hashing (LSH) scores. Given a pair of news, de-duplication 316 calculates the LSH signatures of their titles, descriptions, and contents. The Levenshtein distances and token sort ratios of the title pair, the description pair, and the content pair are computed based on the LSH signatures. These six distances are fed into a SVM model with binary labels that identify whether the pair is duplicate. The SVM is trained over a manually-labeled training data by learning the parameters for these six features. A cut-off threshold is learned based on a validation dataset. The final model is evaluated on a test data.

Relevance layer 306 includes news entity relevance 318. News entity relevance 318 uses a machine learning model to identify main entities. Features are derived from the title, description, and content of each article. Phrase matching is applied for name detection on the title. Natural language processing, such as spaCy6, is used for name detection on the description and content. The model leverages natural language processing to depict entity, noun, and subject recognition in text with standard sentence structure.

Since the title, description, and content of a news article have different purposes, news entity relevance 318 generates independent features respectively for each section. For example, for a title, independent features may identify whether a title starts with the entity name, whether an entity name shows up in a sequence of entity names, and the normalized value of the first location of an entity name.

For description and content, news entity relevance 318 is a normalized mention frequency of an entity name in the text. However, exact matching of the name of a subscription often leads to low recall and introduces noise in the feature, because an entity alias name is often mentioned in a news article instead of the full official name. To overcome this challenge, news entity relevance 318 leverages n-grams, counting the number of tokens that match with each n-gram of an entity name, and then weighting the counts exponentially.

As the false negative is more critical for the particular use-case, news entity relevance 318 puts more weight on the recall score. For example, analysts would not be affected too much by receiving some irrelevant news (i.e., a false positive) to their portfolio. However, missing some of the major events (i.e., a false negative), such as merger and acquisition happening in a company that the analysts are analyzing, can be critical, having a massive and potentially adverse impact on their analysis.

Table 1 is an evaluation result of two different machine learning models that news entity relevance 318 can use to identify main entities, namely logistic regression and distributed gradient boosting, such as XGBoost. The logistic regression model predicts recall score of all the news articles as 1, leading to the low precision score. The logistic regression underperforms when it cannot identify the entity name in the news article at all due to the use of an abbreviation or a pseudo-name.

TABLE 1

Evaluation of News Entity Relevance

|  | Logistic Regression | XGBoost |
|---|---|---|
| Recall | 1.000 | 0.848 |
| Precision | 0.671 | 0.884 |
| F1 | 0.803 | 0.866 |

Relevance layer 306 includes news source relevance 320. In one illustrative example, news source relevance 320 identifies the relevance of news sources by ranking websites in order of popularity. For example, an Alexa Rank can be used as a standard metric to measure and reveal how influential a website is relative to all other sites based on a combination of a site's estimated traffic and visitor engagement.

In one illustrative example, news source relevance 320 first builds a mapping from news sources to domains. News articles are grouped by news sources and domains are extracted from the URLs. All news domains can be kept in case the news articles published by a news source has multiple domains. The output of this step is a hash table where keys are news source names and values are the lists of possible candidate domains that are in descending order.

For each news source, news source relevance 320 sequentially looks up the list of domains in a database of website popularity by frequency until a match is made. News published by the bottom 25% ranked news sources and unranked news sources are filtered out. To ensure the system validity to the financial analysis process, news source relevance 320 can also utilize a white-list of news sources provided by analysts.

Relevance layer 306 includes news topic relevance 322. In one illustrative example, news topic relevance 322 employs one or more machine learning models to predict topic relevance. Aside from certain explicit events, most events that can potentially impact rating activities are implicit and mostly determined by analysts' knowledge and interpretation of the events. To provide training data to the machine learning models, analysts can choose to provide feedback for clusters, i.e., what degrees of relevancy a cluster has and why. News topic relevance 322 can employ a machine learning model to predict user relevance feedback.

Clustering and ranking layer 308 includes deep clustering 324. In one illustrative example, deep clustering 324 employs deep learning methods that considers all words in a document without explicitly figuring out keywords or named entities.

Traditional document clustering methods are mainly word/phrase-based or topic-based algorithms. However, the performance of keyword and named entity extraction is still unsatisfactory on open-domain documents.

In one illustrative example, and in contrast to traditional document clustering methods, deep clustering 324 adopts a two-phase clustering algorithm. Named entities are first extracted from each news article using a statistical model. Each article is represented by a one-hot vector built based on its named entities. The distances of pairwise news articles are computed based on cosine distance. Two news articles are grouped together if their distance is not more than a threshold. One representative news is selected for each cluster based on news publication date and news source significance. The initial set of clusters are then merged based on the representative news. A deep contextualized word representation model, such as ELMo, is used to compute lower dimensional representation for each representative news article.

Unlike widely-used word embeddings, the illustrative embodiments represent words as functions of the entire input sentence, modeling both (1) complex characteristics of word use, such as syntax and semantics, and (2) how these uses vary across linguistic contexts (i.e., polysemy). These word representations are computed on top of multi-layer bidirectional language models (biLMs) with character convolutions, as a linear function of the internal network states. The output of the deep learning model is a vector that represents the semantic of a representative news article. Pairwise clusters whose representative news articles are close to each other are merged into one cluster.

Table 2 is an evaluation result of two different machine learning models that deep clustering 324 can use to cluster different news representations. The two-phase clustering is compared with 1) a name entity-based (NER), in which spaCy natural language processing and one-hot encoding are used to extract and model named entities; and 2) a latent dirichlet allocation (LDA) based model, in which a LDA model is used to compute low dimensional news representation. The clustering is done on a labeled news collection of three days.

TABLE 2

Evaluation of Clustering

|  | NER | LDA | Two-Phase |
|---|---|---|---|
| Adjusted Rand Score | 0.0293 | 0.2843 | 0.3531 |
| Adjusted MI Score | 0.1126 | 0.2757 | 0.3452 |

The performance is evaluated by adjusted rand score and adjusted mutual information score, two commonly-used metrics for clustering evaluation. The result show that the deep contextualized word representation model significantly outperforms the other models.

Figure 4:
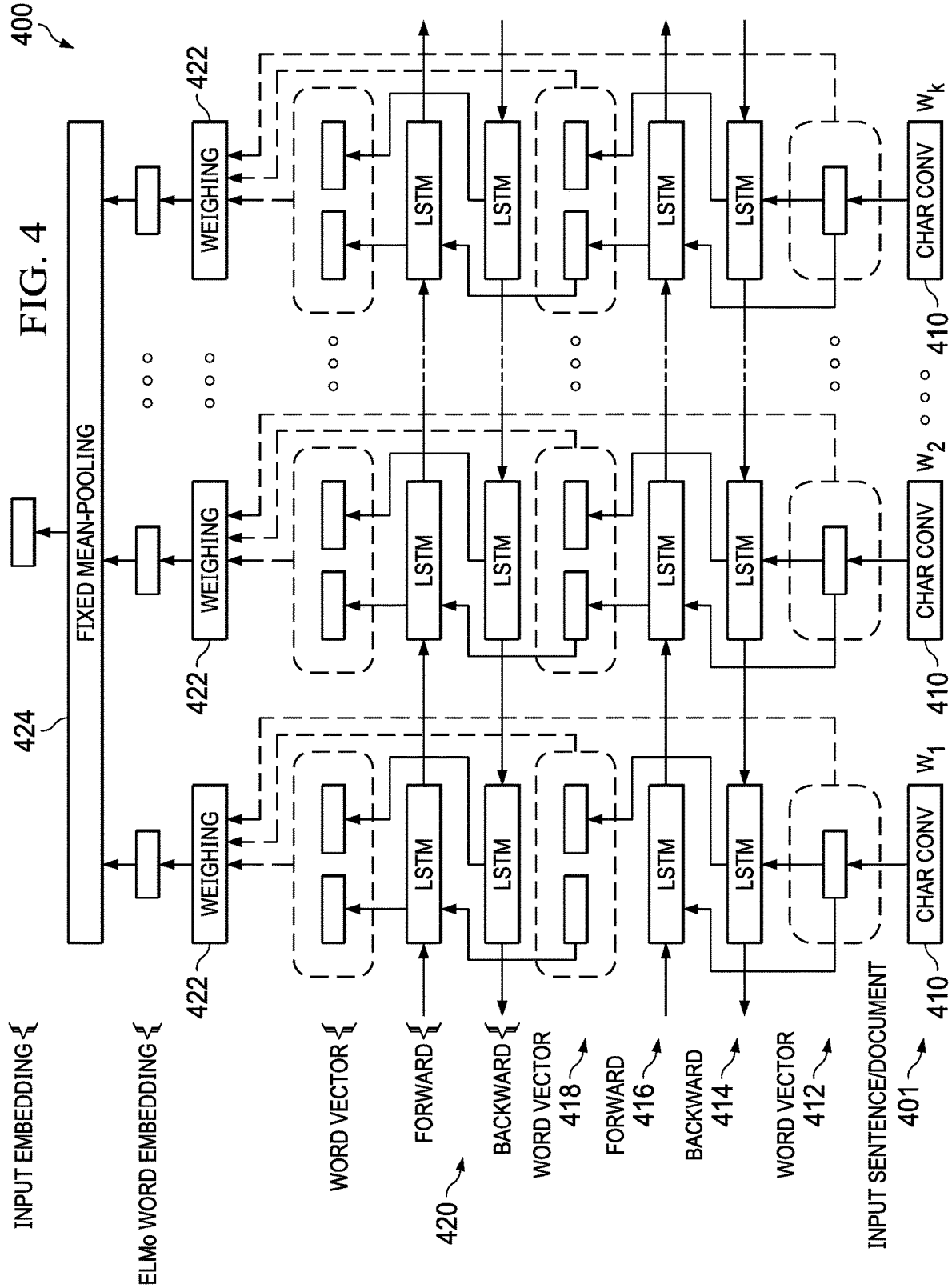
FIG. 4 is an illustration of a structure of a neural network model for computing a lower dimensional representation of data news article in accordance with an illustrative embodiment.

Referring now to FIG. 4, an illustration of a structure of a neural network model for computing a lower dimensional representation of data news article is depicted in accordance with an illustrative example. Neural network model 400 is an example of a deep contextualized word representation model that can be used by deep clustering 324 of FIG. 3.

At input layer 401, each token 410 is converted to an appropriate representation 412 using character embeddings. The representations are then run through a convolutional layer 414 using some number of filters, followed by a max-pool layer 416.

Representations 418 are passed through a 2-layer highway network before being provided as the input to the biLMs layer 420. Character convolutions are used to learn morphological features and form a valid representation for out-of-vocabulary words.

The biLMs learn embeddings for each word from different directions. To combine these embeddings into one, weighted average 422 is applied based on softmax normalization. To get a sentence representation, fixed mean-pooling 424 is applied over all contextualized word representations.

Referring again to FIG. 3, the news representations can be fed into a clustering algorithm, such as k-means and hierarchical clustering. In one illustrative example, deep clustering 324 clusters news representations according to a pseudo on-line clustering algorithm. Algorithm 2 provides pseudocode for clustering news received in a news cycle in chronological order by publication time.

---
Algorithm 2: Pseudo-online Clustering
---
C ← C' // store current clusters;
for each $d_i$ in D do
    | if    |C| > 0 then
    |   |   compute the pairwise cosine similarities S
    for
    |   |   $d_i$ and the centroid of each $c_j$ in C;
    |   |   if min(S) < λ then
    |   |   |   add $d_i$ to the nearest cluster in D;
    |   |   |   continue;
    |   |   end
    |   end
    |   create a singleton cluster for $d_i$ and add to C;
end
Discard clusters that are not added any news within t;

---

Wherein:
News received in the new cycle D={$d_1, d_2, \ldots, d_n$};
Historical news clusters computed at the end of the previous cycle C'={$c_1', c_2', \ldots, c_m'$};
A maximum similarity threshold λ; and
A time window t.

Generally, the news is sorted in chronological order, while also considering historical news clusters formed in the previous news cycle, i.e., t is set to one day. Each news event received in the current cycle is assigned to the nearest existing cluster. If the nearest cluster is not found or there is no existing cluster, a singleton cluster is initialized by the news. Incoming news is clustered iteratively in chronological order, mimicking the chronology in which they are received. Finally, the clusters that have not been updated within the news cycle are discarded. Algorithm 2 is further described below in relation to FIG. 7.

Clustering and ranking layer 308 includes both news ranking 326 and cluster ranking 328. clustering and ranking layer 308 ranks both clusters and news in each cluster, decreasing a probability that important news events get buried in the user interface.

In one illustrative example, news ranking 326 ranks news within each cluster by two factors sequentially: 1) publication date; and 2) news ranking score. Ranking by publication date ensures that analysts can see newly-added news in those historical clusters. Ranking by news ranking score prioritizes the most relevant news within each cluster. In one illustrative example, the news ranking score is the weighted sum of the entity relevance score and news source relevance, and the weight of the relevance score was set empirically based on analysts' feedback.

In one illustrative example, cluster ranking 328 ranks clusters by three factors sequentially: 1) update date; 2) clustering ranking score; and 3) cluster size. The updated date is a good indicator of the event recentness. Ranking by the update date ensures analysts do not miss new news events. A clustering ranking score is one indicator of event importance. In one illustrative example, the clustering ranking score is computed by taking the maximum news ranking score of all the news within the cluster and summing the weighted cluster size. Cluster size is another indicator of event importance. Important clusters tend to have large sizes because more news sources may cover the news events.

Referring now to FIG. 5, an illustration of a graphical user interface of a news recommendation system is depicted in accordance with an illustrative embodiment. Graphical user interface 500 is an example of graphical user interface 230, shown in block form in FIG. 2.

Graphical user interface 500 includes data objects 510, 512, 514, and 516. By default, the representative news of all represented clusters are presented with titles 518, entity names 520, descriptions 522, and publication dates 524.

Each data object can include one or more control elements. On the right side, analysts can mark the whole cluster as read by clicking on check icon 526. Analysts can also provide feedback on the cluster relevancy by clicking on dialog icon 528. The relevance feedback provided through user interface 500 can be used to adjust a news topic relevance model, such as a model employed by topic relevance 322 of FIG. 3.

Data object 512 includes additional "View 3 More" control element 530. By clicking control element 530, analysts can unfold data object 512, and view the additional news articles in that cluster.

Figure 6:
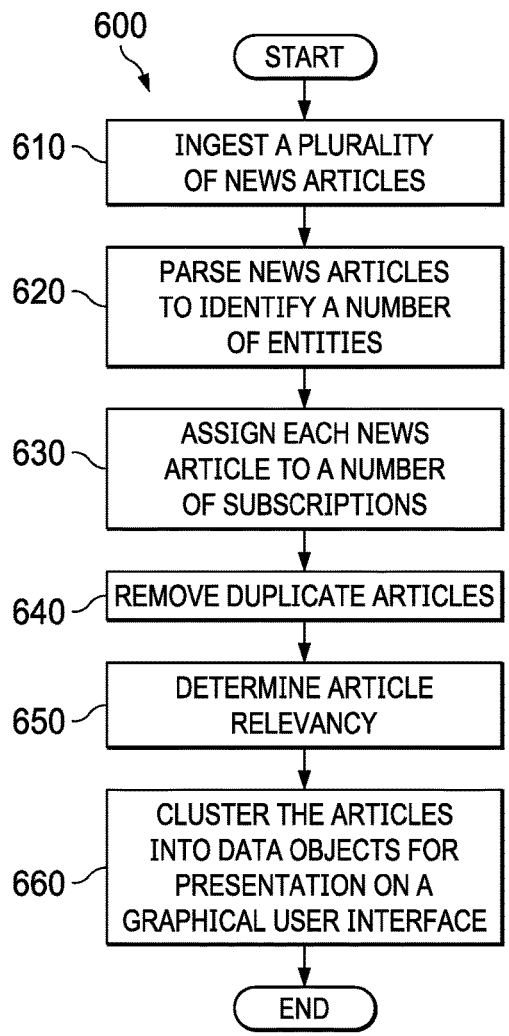
FIG. 6 is a flowchart illustrating a process for identifying and recommending relevant news articles in accordance with an illustrative embodiment.

FIG. 6 is a flowchart illustrating a process for identifying and recommending relevant news articles depicted in accordance with an illustrative embodiment. Process 600 can be implemented in one or more components of news recommendation system 202, as shown in block form in FIG. 2.

Process 600 begins by ingesting a plurality of news articles (step 610). The news articles can be news articles 204 of FIG. 2, provided from a number of different data sources.

Process 600 parses the articles to identify a number of entities (step 620), and, based on the identified entities, assigns each article to a number of subscriptions (step 630).

Within each subscription, process 600 removes duplicate articles (step 640), and determines article relevancy (step 650). The article relevancy can include news entity relevance, news source relevance, and news topic relevance.

Process 600 then clusters the articles into data objects for presentation on a graphical user interface (step 660), with process 600 terminating thereafter. The clustering can include, for example, individual news ranking within each cluster, and cluster ranking across the number of clusters.

Figure 7:
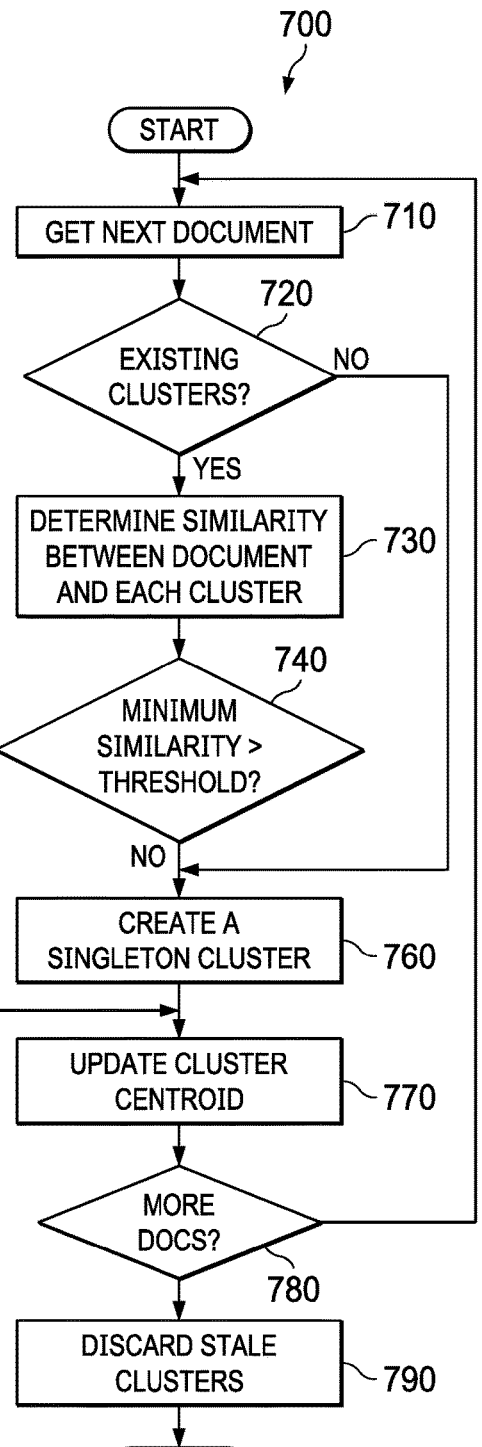
FIG. 7 is a flowchart illustrating a process for clustering news received in a news cycle in accordance with an illustrative embodiment.

Referring now to FIG. 7, a flowchart illustrating a process for clustering news received in a news cycle is depicted in accordance with an illustrative embodiment. Process 700 can be implemented as a clustering algorithm, such as Algorithm 2, used by deep clustering 324 of FIG. 3.

Generally, the news is sorted in chronological order, while also considering historical news clusters formed in the previous news cycle, i.e., t is set to one day. Each news received in the current cycle (step 710) is assigned to the nearest existing cluster (step 750) based on a determined similarity between the documents (step 730). If the nearest cluster is not found ("no" at step 740) or there is no existing cluster ("no" at step 720), a singleton cluster is initialized (step 760) by the news. The representative center of the cluster is updated (step 770). Incoming news is clustered iteratively in chronological order (step 780), mimicking the chronology in which they are received. Finally, the clusters that have not been updated within the news cycle are discarded (step 790). Afterwards, process 700 terminates.

Figure 8:
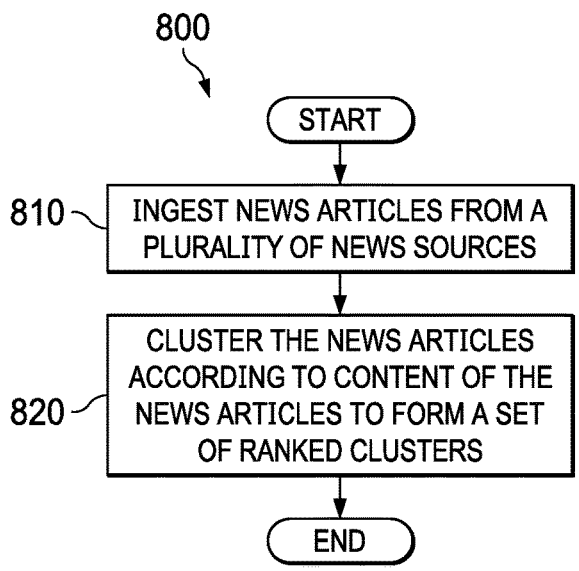
FIG. 8 is a flowchart illustrating a process for clustering news articles in a subscription-based news system in accordance with an illustrative embodiment.

With reference now to FIG. 8, a flowchart illustrating a process for clustering news articles in a subscription-based news system is depicted in accordance with an illustrative embodiment. Process 800 can be implemented in one or more components of news recommendation system 202, shown in block form in FIG. 2.

Process 800 begins by ingesting news articles from a plurality of news sources (step 810). The different news sources can be one or more news providers, such as news providers 310, 312, and 314 of FIG. 3.

Process 800 clusters the news articles according to content of the news articles to form a set of ranked clusters (step 820), with process 800 terminating thereafter. The clustering is performed using the artificial intelligence system, such as artificial intelligence system 224 of FIG. 2. Process 800 uses a deep learning clustering algorithm that sorts the news articles in chronological order, while also considering historical news clusters formed in a previous news cycle, such as the algorithm described in FIG. 7.

In one illustrative example, clustering the news articles according to content of the news articles can include ranking news articles within each cluster sequentially by a publication date and a news ranking score to form the set of ranked clusters. In one illustrative example, clustering the news articles according to the content of the news articles can include ranking clusters sequentially by date, clustering ranking score, and cluster size. The date can be, for example, a cluster-creation date or a cluster-update date.

Figure 9:
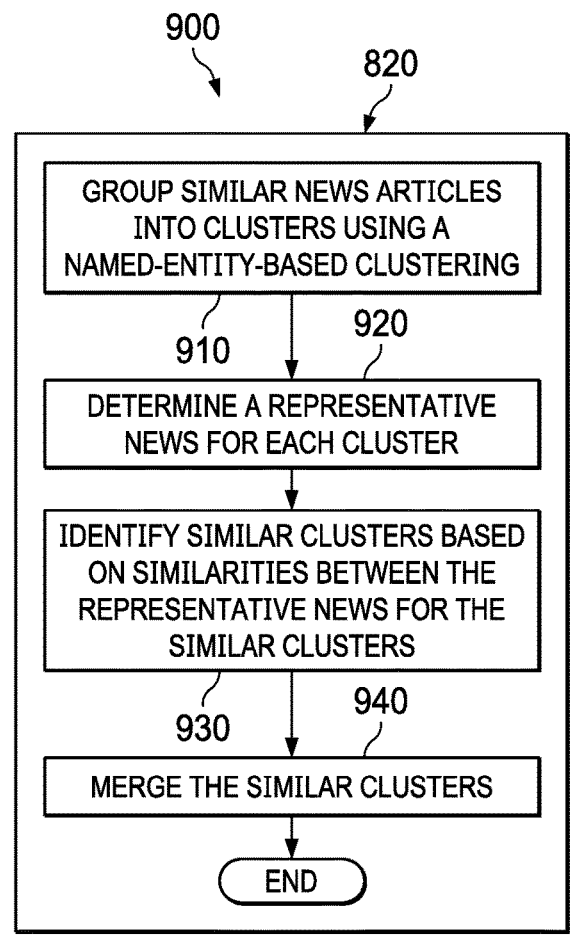
FIG. 9 is a flowchart illustrating a process for clustering news articles using a deep learning clustering algorithm in accordance with an illustrative embodiment.

With reference now to FIG. 9, a flowchart illustrating a process for clustering news articles using a deep learning clustering algorithm is depicted in accordance with an illustrative embodiment. Process 900 is one example of step 820, as shown in FIG. 8.

Process 900 begins by grouping similar news articles into clusters using a named-entity-based clustering algorithm (step 910). In one illustrative example, the news articles are clustered iteratively in chronological order within a news cycle.

Process 900 determines a representative news for each cluster (step 920). In one illustrative example, a pairwise cosine similarity is determined between the lower dimensional representation of the news article and a centroid of each existing news cluster. The closest news cluster is the cluster having a greatest pairwise cosine similarity.

Next, process 900 identifies similar clusters based on similarities between the representative news for a cluster pair (step 930).

Process 900 merges the similar clusters (step 940). The process terminates thereafter.

Figure 10:
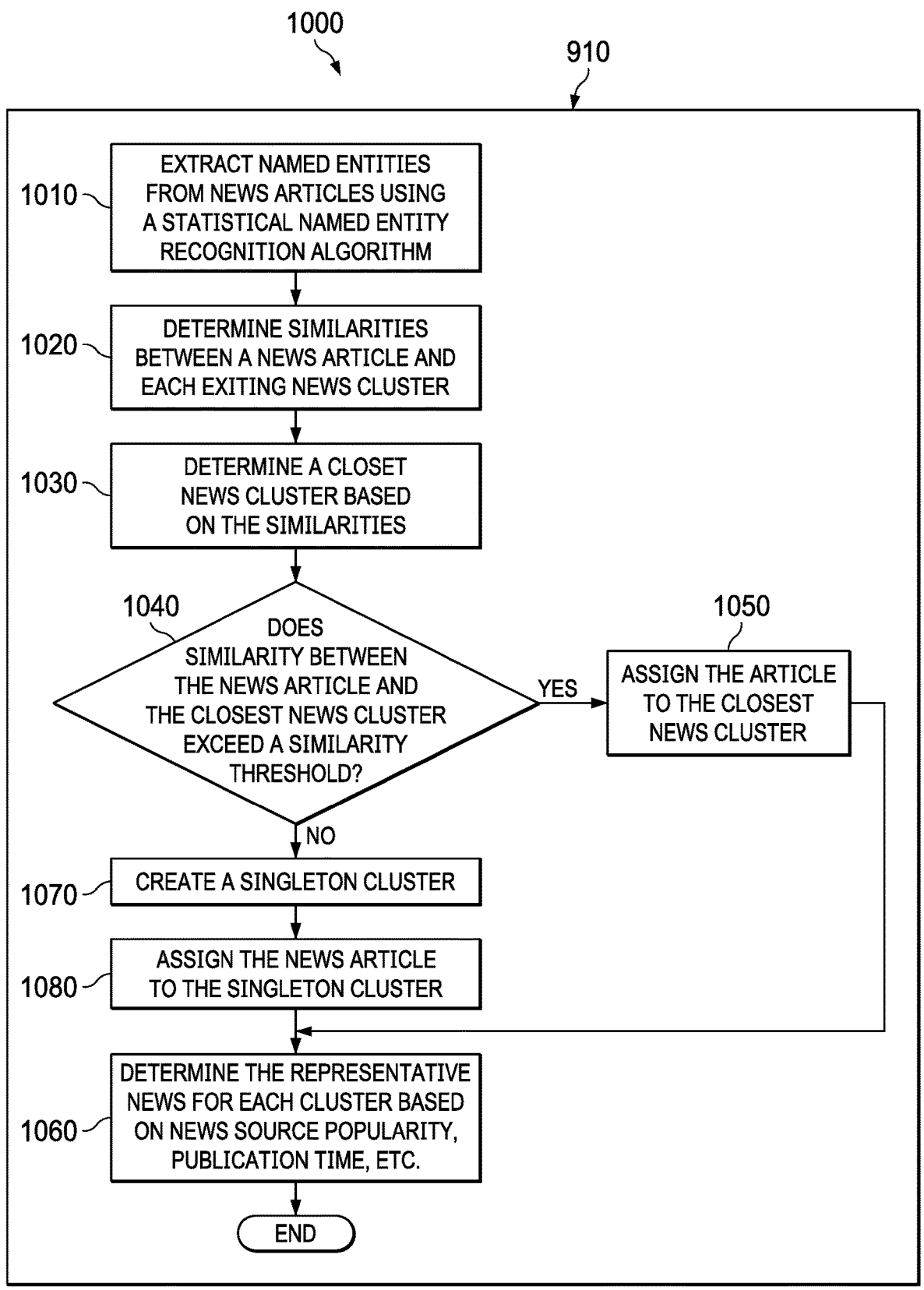
FIG. 10 is a flowchart illustrating a process for using a deep learning clustering algorithm in accordance with an illustrative embodiment.

With reference now to FIG. 10, a flowchart illustrating a process using a named-entity-based clustering algorithm is depicted in accordance with an illustrative embodiment. Process 1000 is one example of step 910, as shown in FIG. 9.

Process 1000 extracts named entities from news articles using a statistical named-entity recognition algorithm (step 1010). Process 1000 then determines similarities between a news article and each exiting news cluster (step 1020).

Process 1000 determines a closest news cluster based on the similarities (step 1030).

Process 1000 determines whether the similarity between the news article and the closest news cluster exceeds a similarity threshold (step 1040). In response to determining that the similarity exceeds the similarity threshold ("yes" at step 1040), process 1000 assigns the article to the closest news cluster (step 1050). Thereafter, process 1000 determines the representative news for the updated cluster, such as in step 920) of FIG. 9 and terminates thereafter.

Returning to step 1040, in response to determining that the similarity does not exceed the similarity threshold ("no" at step 1040), process 1000 creates a singleton cluster (step 1070), and assigns the news article to the singleton cluster (step 1080). Thereafter, process 1000 determines the representative news for the updated cluster, such as in step 920 in FIG. 9 and terminates thereafter.

Figure 11:
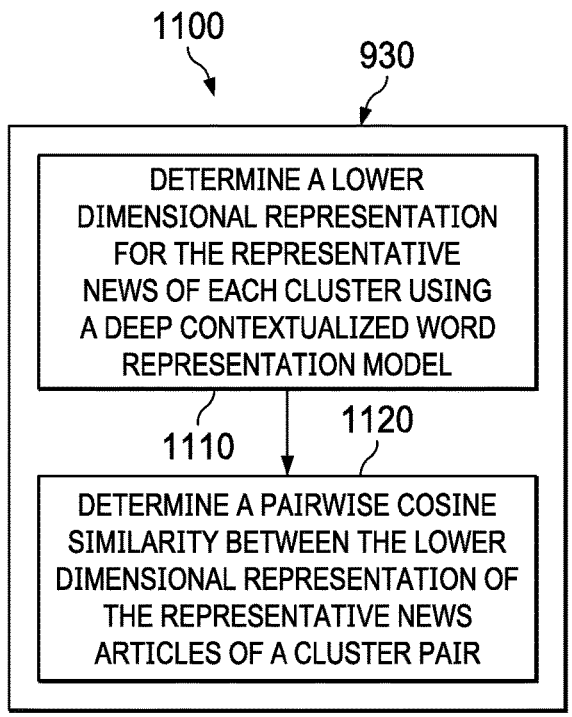
FIG. 11 is a flowchart illustrating a process for identifying similar clusters in accordance with illustrative embodiments.

With reference now to FIG. 11, a flowchart illustrating a process for identifying similar clusters is depicted in accordance with an illustrative embodiment. Process 1100 is one example of step 930, as shown in FIG. 9.

Process 1100 determines a lower dimensional representation for the representative news of each cluster using a deep contextualized word representation model (step 1110). Process 1100 then determines a pairwise cosine similarity between the lower dimensional representation of the representative news articles of a cluster pair (step 1120). Thereafter, process 1100 merges the similar clusters, such as in step 940 of FIG. 9.

Figure 12:
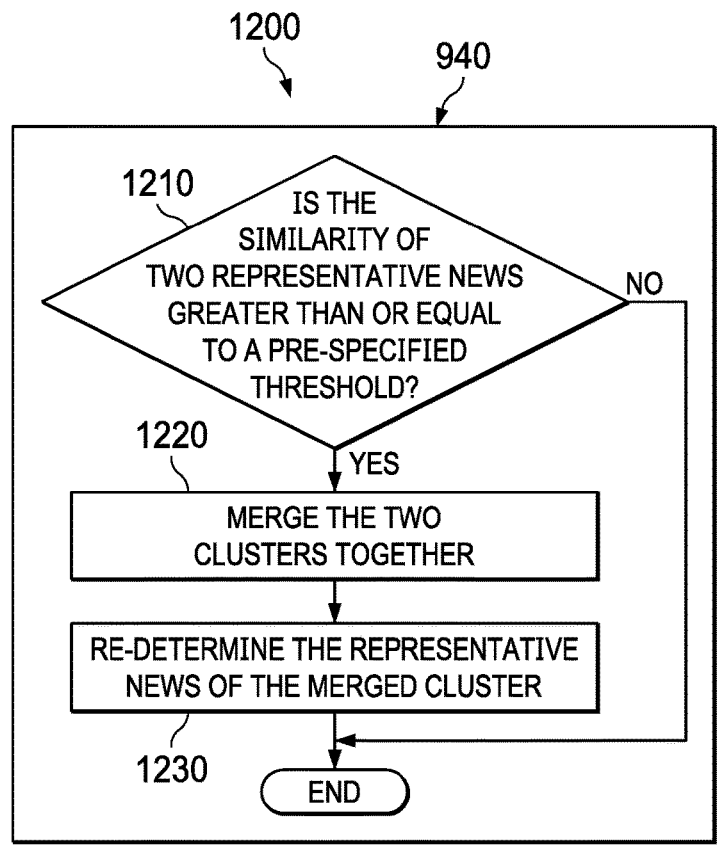
FIG. 12 is a flowchart illustrating a process for merging similar clusters in accordance with illustrative embodiments.

With reference now to FIG. 12, a flowchart illustrating a process for merging similar clusters is depicted in accordance with an illustrative embodiment. Process 1200 is one example of step 940, as shown in FIG. 9.

Continuing from step 930, process 1200 determines whether a pairwise cosine similarity between the lower dimensional representation of the representative news of the cluster pair is greater than or equal to a pre-specified threshold (step 1210). In response to determining that the similarity is greater than or equal to a pre-specified threshold ("yes" at step 1210), process 1200 merges the cluster pair together into a merged cluster (step 1220). Process 1200 then re-determines the representative news article of the merged cluster (step 1230), and terminates thereafter.

Returning now to step 1210, in response to determining that the similarity is not greater than or equal to a pre-specified threshold ("no" at step 1210), the cluster pair is not merged. Instead, the clusters remain separate, and process 1200 terminates thereafter.

Figure 13:
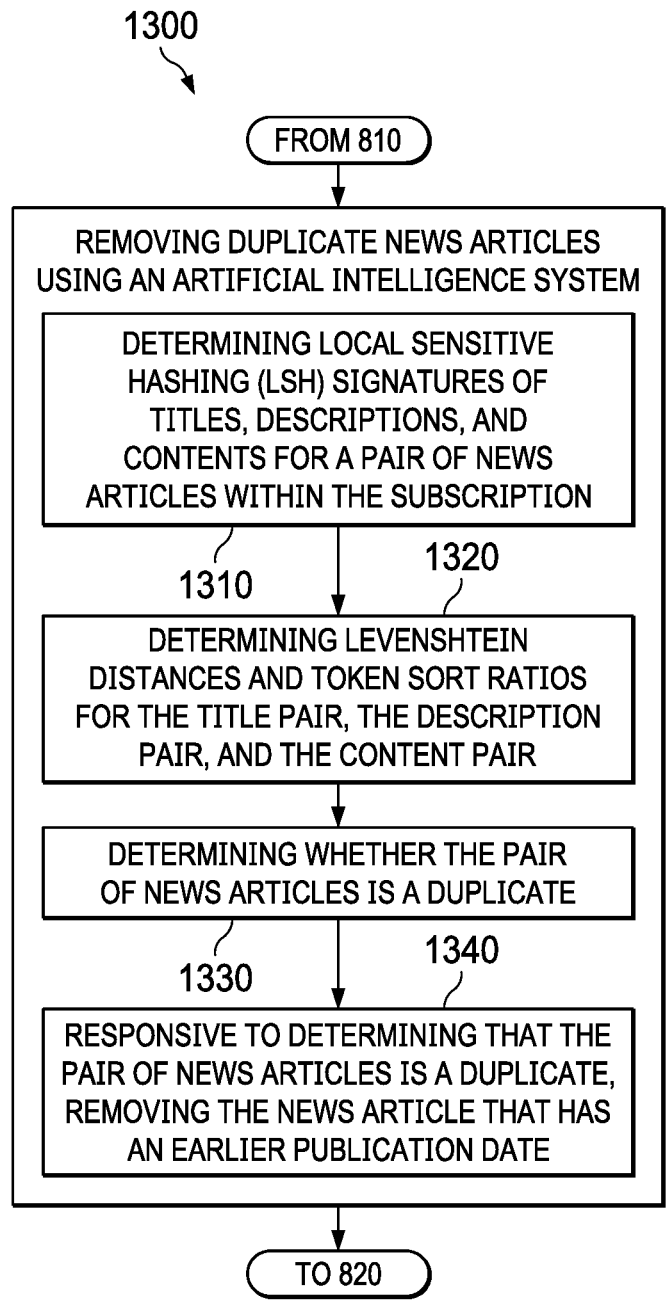
FIG. 13 is a flowchart illustrating a process for removing duplicate news articles using an artificial intelligence system in accordance with an illustrative embodiment.

Referring now to FIG. 13, a flowchart illustrating a process for removing duplicate news articles using an artificial intelligence system is depicted in accordance with an illustrative embodiment. Process 1300 can be implemented as part of process 800, as shown in FIG. 8.

Continuing from step 810, process 1300 determines Local Sensitive Hashing (LSH) signatures of titles, descriptions, and contents for a pair of news articles within the subscription (step 1310).

The process determines Levenshtein distances and token sort ratios for the title pair, the description pair, and the content pair based on the LSH signatures (step 1320).

The process determines whether the pair of news articles is a duplicate based on a support vector machine model of the Levenshtein distances and token sort ratios for the title pair, the description pair, and the content pair (step 1330).

Responsive to determining that the pair of news articles is a duplicate, process 1300 removes the news article that has an earlier publication date (step 1340). The process can then continue to step 820, as shown in FIG. 8.

Figure 14:
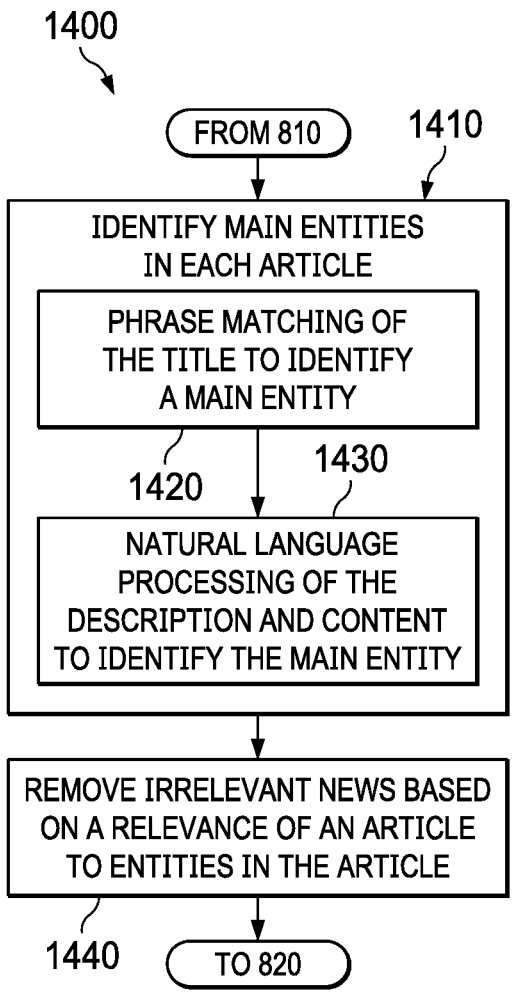
FIG. 14 is a flowchart illustrating a process for removing irrelevant news in accordance with an illustrative embodiment.

With reference now to FIG. 14, a flowchart illustrating a process for removing irrelevant news is depicted in accordance with illustrative embodiments. Process 1400 can be implemented as part of process 800, as shown in FIG. 8.

Continuing from step 810, process 1400 identifies main entities in each article (step 1410). In one illustrative example, process 1400 uses a machine learning model that independently derives features from the title, description, and content of each article. In an illustrative embodiment, phrase matching can include analyzing a grammatic structure of the phrase. For example, analyzing the grammatic structure may include identifying a contextual location of an entity name within the phrase, such as a beginning, middle, or end. Analyzing the grammatic structure can include identifying a part-of-speech or part-of-sentence of the entity name, such as whether the entity name is the proper noun, subject, direct object, indirect object, etc. of the phrase.

In this illustrative example, identifying the main entries includes phrase matching of the title to identify a main entity (step 1420). Identifying the main entries includes natural language processing of the description and content to identify the main entity (step 1430). The natural language processing can include n-gram modeling that counts a number of tokens that match with each n-gram of an entity name, and then weights the counts exponentially.

The process removes irrelevant news articles based on the relevance of the article to the one or more entities identified in the article (step 1440). The process can then continue to step 820, as shown in FIG. 8.

Figure 15:
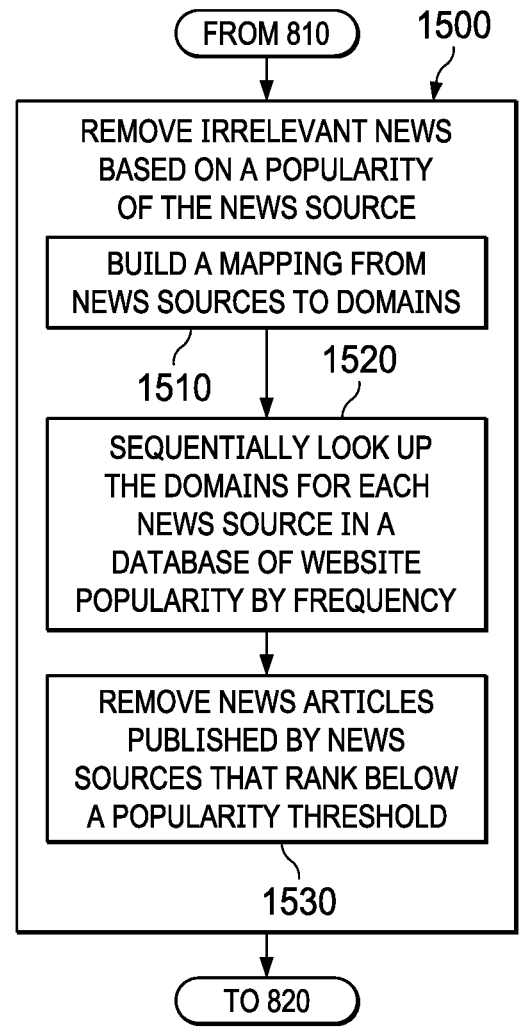
FIG. 15 is a flowchart illustrating a process for news articles based on a popularity of the news source in accordance with an illustrative embodiment.

With reference now to FIG. 15, a flowchart illustrating a process for removing news articles based on a popularity of a news source of the news articles is depicted in accordance with an illustrative embodiment. Process 1500 can be implemented as part of process 800, as shown in FIG. 8.

Continuing from step 810, process 1500 builds a mapping from news sources to domains (step 1510). In one illustrative example, building the mapping can include grouping news articles by news sources. In one illustrative example, building the mapping can include extracting the domains from the URLs of the news articles.

For each news source, process 1500 sequentially looks up the domains in a database of website popularity by frequency until a match is made (step 1520).

Process 1500 removes news articles published by news sources that rank below a popularity threshold in the database of website popularity (step 1530). The process can then continue to step 820, as shown in FIG. 8.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 16:
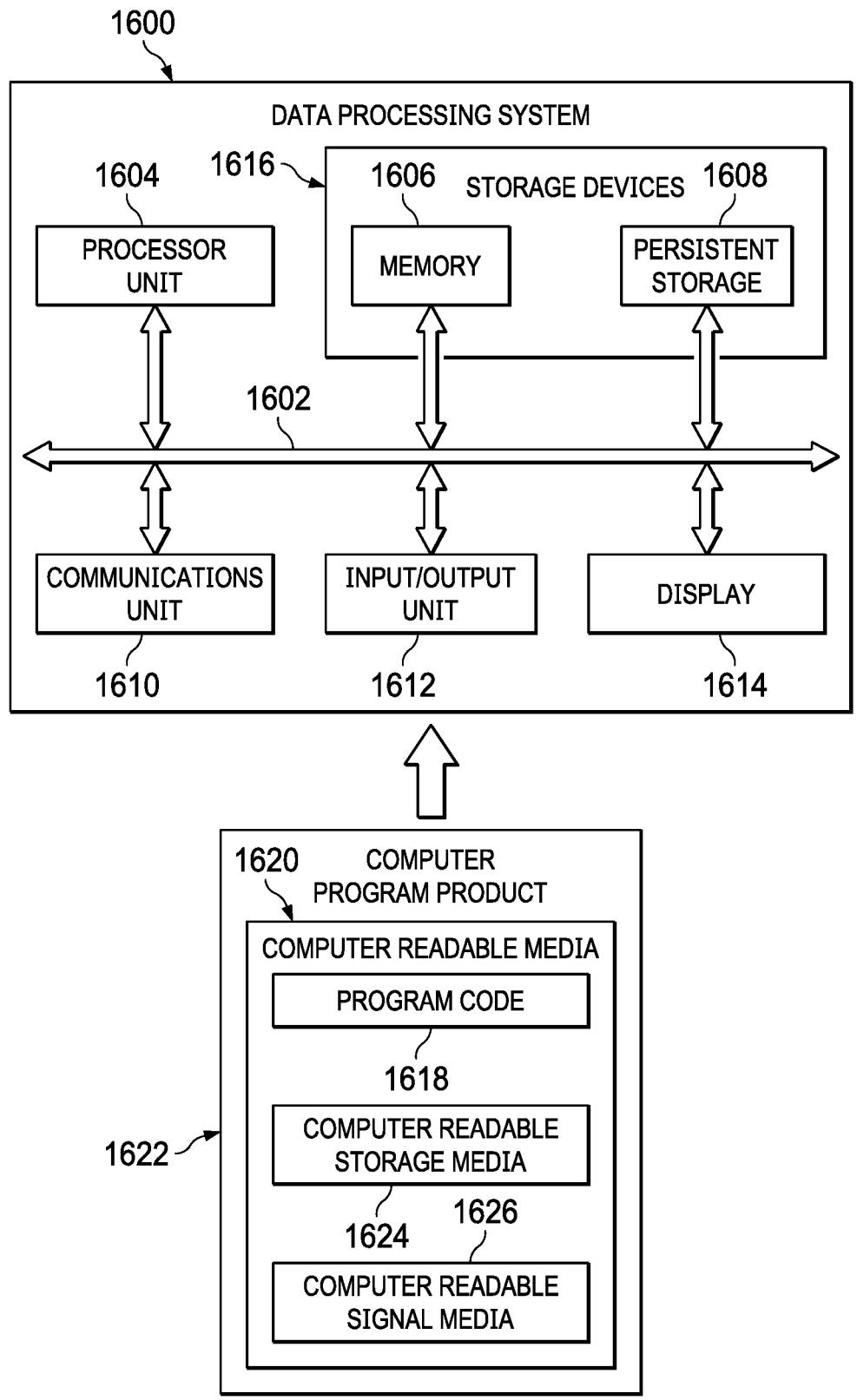
FIG. 16 is an illustration of a block diagram of a data processing system in accordance with an illustrative embodiment.

Turning now to FIG. 16, an illustration of a block diagram of a data processing system is depicted in accordance with an illustrative embodiment. Data processing system 1600 may be used to implement one or more computers and client computer system 110 in FIG. 1. In this illustrative example, data processing system 1600 includes communications framework 1602, which provides communications between processor unit 1604, memory 1606, persistent storage 1608, communications unit 1610, input/output unit 1612, and display 1614. In this example, communications framework 1602 may take the form of a bus system.

Processor unit 1604 serves to execute instructions for software that may be loaded into memory 1606. Processor unit 1604 may be a number of processors, a multi-processor core, or some other type of processor, depending on the particular implementation. In an embodiment, processor unit 1604 comprises one or more conventional general-purpose central processing units (CPUs). In an alternate embodiment, processor unit 1604 comprises one or more graphical processing units (CPUs).

Memory 1606 and persistent storage 1608 are examples of storage devices 1616. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1616 may also be referred to as computer-readable storage devices in these illustrative examples. Memory 1616, in these examples, may be, for example, a random access memory or any other suitable volatile or non-volatile storage device. Persistent storage 1608 may take various forms, depending on the particular implementation.

For example, persistent storage 1608 may contain one or more components or devices. For example, persistent storage 1608 may be a hard drive, a flash memory, a rewritable optical disk, a rewritable magnetic tape, or some combination of the above. The media used by persistent storage 1608 also may be removable. For example, a removable hard drive may be used for persistent storage 1608. Communications unit 1610, in these illustrative examples, provides for communications with other data processing systems or devices. In these illustrative examples, communications unit 1610 is a network interface card.

Input/output unit 1612 allows for input and output of data with other devices that may be connected to data processing system 1600. For example, input/output unit 1612 may provide a connection for user input through at least one of a keyboard, a mouse, or some other suitable input device. Further, input/output unit 1612 may send output to a printer. Display 1614 provides a mechanism to display information to a user.

Instructions for at least one of the operating system, applications, or programs may be located in storage devices 1616, which are in communication with processor unit 1604 through communications framework 1602. The processes of the different embodiments may be performed by processor unit 1604 using computer-implemented instructions, which may be located in a memory, such as memory 1606.

These instructions are referred to as program code, computer-usable program code, or computer-readable program code that may be read and executed by a processor in processor unit 1604. The program code in the different embodiments may be embodied on different physical or computer-readable storage media, such as memory 1606 or persistent storage 1608.

Program code 1618 is located in a functional form on computer-readable media 1620 that is selectively removable and may be loaded onto or transferred to data processing system 1600 for execution by processor unit 1604. Program code 1618 and computer-readable media 1620 form computer program product 1622 in these illustrative examples. In one example, computer-readable media 1620 may be computer-readable storage media 1624 or computer-readable signal media 1626.

In these illustrative examples, computer-readable storage media 1624 is a physical or tangible storage device used to store program code 1618 rather than a medium that propagates or transmits program code 1618. Alternatively, program code 1618 may be transferred to data processing system 1600 using computer-readable signal media 1626.

Computer-readable signal media 1626 may be, for example, a propagated data signal containing program code 1618. For example, computer-readable signal media 1626 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1600 are not meant to provide architectural limitations to the manner in which different embodiments may be implemented. The different illustrative embodiments may be implemented in a data processing system including components in addition to or in place of those illustrated for data processing system 1600. Other components shown in FIG. 16 can be varied from the illustrative examples shown. The different embodiments may be implemented using any hardware device or system capable of running program code 1618.

The news recommendation system described herein offers several advantages that allow financial analysts to work more effectively and efficiently. The news recommendation system described herein presents a full stack financial news recommendation system from data storage to a graphical user interface that can be easily deployed at any financial company. With a subscription-based pipeline, the system can be conveniently parallelized and extended for new business monitoring requirements. By using a series of clustering and relevancy models, the system is able to recommend news events that have a direct relevancy to the final outcome of analysis, e.g., credit rating, at a financial firm.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art.

Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for clustering news articles in a subscription-based news system, the method comprising:
   ingesting news articles from a plurality of news sources;
   removing duplicate news articles using an artificial intelligence system, wherein removing duplicate news articles further comprises:
      determining Local Sensitive Hashing (LSH) signatures of titles, descriptions, and contents for news articles within a subscription;
      determining Levenshtein distances and token sort ratios for titles, descriptions, and content for pairs of the news articles based on the LSH signatures;
      determining whether a pair of news articles is a duplicate based on a Support Vector Machine model of the Levenshtein distances and token sort ratios for the titles, descriptions, and content for pairs of the news articles; and
      responsive to determining that the pair of news articles is a duplicate, removing the news article of the pair of news articles that has an earlier publication date; and
   clustering the news articles according to content of the news articles to form a set of ranked clusters, wherein the clustering is performed using an artificial intelligence system having a deep learning clustering algorithm that sorts the news articles in chronological order, while also considering historical news clusters formed in a previous news cycle, wherein the deep learning clustering algorithm comprises the steps of:
      grouping similar news articles into clusters using a named-entity-based clustering algorithm;
      determining a representative news for each cluster;
      identifying similar clusters based on similarities between the representative news for a cluster pair; and
      merging the similar clusters.

2. The computer-implemented method of claim 1, wherein the news articles are clustered iteratively in chronological order within a news cycle.

3. The computer-implemented method of claim 1, wherein the named-entity-based clustering algorithm further comprises the steps of:
   extracting named entities from news articles using a statistical named entity recognition algorithm;
   determining similarities between a news article and each exiting cluster;
   determining a closest cluster based on the similarities;
   responsive to the similarity between the news article and the closest cluster exceeding a similarity threshold, assigning the news article to the closest cluster; and
   re-determining the representative news for the closest cluster.

4. The computer-implemented method of claim 3, wherein the named-entity-based clustering algorithm further comprises the steps of:
   responsive to the similarity between the news article and the closest news cluster not exceeding the similarity threshold, creating a singleton cluster; and
   assigning the news article to the singleton cluster.

5. The computer-implemented method of claim 3, wherein the deep learning clustering algorithm further comprises the steps of:
   determining a lower dimensional representation for the representative news for each cluster using a deep contextualized word representation model;
   wherein identifying similar clusters further comprises:
   determining a pairwise cosine similarity between the lower dimensional representation of the representative news of the cluster pair.

6. The computer-implemented method of claim 5, further comprising:
   responsive to the pairwise cosine similarity of the cluster pair being greater than or equal to a pre-specified threshold, merging the cluster pair together into a merged cluster; and re-determining the representative news of the merged cluster.

7. The computer-implemented method of claim 6, wherein clustering the news clusters to form the set of ranked clusters further comprises:
ranking news articles within each cluster sequentially by publication date and news ranking score to form the set of ranked clusters.

8. The computer-implemented method of claim 6, wherein clustering the news clusters to form the set of ranked clusters further comprises further comprises:
ranking clusters sequentially by update date, clustering ranking score, and cluster size.

9. The computer-implemented method of claim 5, wherein the pairs of clusters are not merged if the pairwise cosine similarity of the cluster pair is less than a pre-specified threshold.

10. The computer-implemented method of claim 1 further comprising:
identifying main entities in each article using a machine learning model that independently derives features from a title, a description, and a content of each article, wherein identifying the main entities includes:
phrase matching of the title to identify one or more main entities; and
natural language processing of the description and content to identify the one or more main entities, including n-gram modeling that counts a number of tokens that match with each n-gram of an entity name, and then weighs the counts exponentially; and
prior to clustering the news articles, using an artificial intelligence system to remove irrelevant news articles based on a relevance of an article to one or more main entities identified in the article.

11. The computer-implemented method of claim 1, further comprising:
prior to clustering the news articles, removing irrelevant news based on a popularity of the news source of the news article, wherein removing irrelevant news based on the popularity of the news source of the news article further comprises:
building a mapping from news sources to domains, including grouping news articles by news sources and extracting domains from uniform resource locators (URLs) of the news articles;
for each news source, sequentially looking up the domains in a database of website popularity by frequency until a match is made; and
removing news articles published by news sources that rank below a popularity threshold in the database of website popularity.

12. A subscription-based news system, the system comprising:
a bus system;
a storage device connected to the bus system, wherein the storage device stores program instructions; and
a number of processors connected to the bus system, wherein the number of processors execute the program instructions:
to ingest news articles from a plurality of news sources;
to remove duplicate news articles using an artificial intelligence system, wherein removing duplicate news articles further comprises:
determining Local Sensitive Hashing (LSH) signatures of titles, descriptions, and contents for news articles within a subscription;
determining Levenshtein distances and token sort ratios for titles, descriptions, and content for pairs of the news articles based on the LSH signatures;
determining whether a pair of news articles is a duplicate based on a Support Vector Machine model of the Levenshtein distances and token sort ratios for the titles, descriptions, and content for pairs of the news articles; and
responsive to determining that the pair of news articles is a duplicate, removing the news article of the pair of news articles that has an earlier publication date; and
to cluster the news articles according to content of the news articles to form a set of ranked clusters, wherein the clustering is performed using an artificial intelligence system having a deep learning clustering algorithm that sorts the news articles in chronological order, while also considering historical news clusters formed in a previous news cycle, wherein the deep learning clustering algorithm comprises the steps of:
grouping similar news articles into clusters using a named-entity-based clustering algorithm;
determining a representative news for each cluster;
identifying similar clusters based on similarities between the representative news for a cluster pair; and
merging the similar clusters.

13. The subscription-based news system of claim 12, wherein the news articles are clustered iteratively in chronological order within a news cycle.

14. The subscription-based news system of claim 12, wherein the number of processors execute the program instructions of the named-entity-based clustering algorithm:
to extract named entities from news articles using a statistical named entity recognition algorithm;
to determine similarities between a news article and each exiting cluster;
to determine a closest cluster based on the similarities;
responsive to the similarity between the news article and the closest cluster exceeding a similarity threshold, to assign the news article to the closest cluster; and
to re-determine the representative news for the closest cluster.

15. The subscription-based news system of claim 14, wherein the number of processors further execute the program instructions of the named-entity-based clustering algorithm:
responsive to the similarity between the news article and the closest news cluster not exceeding the similarity threshold, to create a singleton cluster; and
to assign the news article to the singleton cluster.

16. The subscription-based news system of claim 14, wherein the number of processors execute the program instructions of the deep learning clustering algorithm:
to determine a lower dimensional representation for the representative news for each cluster using a deep contextualized word representation model;
wherein identifying similar clusters further comprises:
determining a pairwise cosine similarity between the lower dimensional representation of the representative news of the cluster pair.

17. The subscription-based news system of claim 16, wherein the number of processors further execute the program instructions:

responsive to the pairwise cosine similarity of the cluster pair being greater than or equal to a pre-specified threshold, to merge the cluster pair together into a merged cluster; and to re-determine the representative news of the merged cluster.

18. The subscription-based news system of claim 17, wherein clustering the news clusters to form the set of ranked clusters further comprises:

ranking news articles within each cluster sequentially by publication date and news ranking score to form the set of ranked clusters.

19. The subscription-based news system of claim 17, wherein clustering the news clusters to form the set of ranked clusters further comprises further comprises:

ranking clusters sequentially by update date, clustering ranking score, and cluster size.

20. The subscription-based news system of claim 16, wherein the pairs of clusters are not merged if the pairwise cosine similarity of the cluster pair is less than a pre-specified threshold.

21. The subscription-based news system of claim 12, wherein the number of processors further execute the program instructions:

to identify main entities in each article using a machine learning model that independently derives features from a title, a description, and a content of each article, wherein identifying the main entities includes:

phrase matching of the title to identify one or more main entities; and natural language processing of the description and content to identify the one or more main entities, including n-gram modeling that counts a number of tokens that match with each n-gram of an entity name, and then weighs the counts exponentially; and prior to clustering the news articles, to use an artificial intelligence system to remove irrelevant news articles based on a relevance of an article to one or more main entities identified in the article.

22. The subscription-based news system of claim 12, wherein the number of processors further execute the program instructions:

prior to clustering the news articles, to remove irrelevant news based on a popularity of the news source of the news article, wherein removing irrelevant news based on the popularity of the news source of the news article further comprises:

building a mapping from news sources to domains, including grouping news articles by news sources and extracting domains from uniform resource locators (URLs) of the news articles;

for each news source, sequentially looking up the domains in a database of website popularity by frequency until a match is made; and removing news articles published by news sources that rank below a popularity threshold in the database of website popularity.

23. A computer program product for clustering news articles, the computer program product comprising:

a non-volatile computer readable storage medium having program code embodied therewith, the program code including:

program code for ingesting news articles from a plurality of news sources;

program code for removing duplicate news articles using an artificial intelligence system, wherein removing duplicate news articles further comprises:

determining Local Sensitive Hashing (LSH) signatures of titles, descriptions, and contents for news articles within a subscription;

determining Levenshtein distances and token sort ratios for titles, descriptions, and content for pairs of the news articles based on the LSH signatures;

determining whether a pair of news articles is a duplicate based on a Support Vector Machine model of the Levenshtein distances and token sort ratios for the titles, descriptions, and content for pairs of the news articles; and responsive to determining that the pair of news articles is a duplicate, removing the news article of the pair of news articles that has an earlier publication date; and program code for clustering the news articles according to content of the news articles to form a set of ranked clusters, wherein the clustering is performed using an artificial intelligence system having a deep learning clustering algorithm that sorts the news articles in chronological order, while also considering historical news clusters formed in a previous news cycle wherein the deep learning clustering algorithm comprises:

program code for grouping similar news articles into clusters using a named-entity-based clustering algorithm;

program code for determining a representative news for each cluster;

program code for identifying similar clusters based on similarities between the representative news for a cluster pair; and merging the similar clusters.

24. The computer program product of claim 23, wherein the news articles are clustered iteratively in chronological order within a news cycle.

25. The computer program product of claim 23, wherein the named-entity-based clustering algorithm further comprises:

program code for extracting named entities from news articles using a statistical named entity recognition algorithm;

program code for determining similarities between a news article and each exiting cluster;

program code for determining a closest cluster based on the similarities;

program code for assigning the news article to the closest cluster in response to the similarity between the news article and the closest cluster exceeding a similarity threshold; and program code for re-determining the representative news for the closest cluster.

26. The computer program product of claim 25, wherein the named-entity-based clustering algorithm further comprises:

program code for responsive to the similarity between the news article and the closest news cluster not exceeding the similarity threshold, creating a singleton cluster; and program code for assigning the news article to the singleton cluster.

27. The computer program product of claim 25, wherein the deep learning clustering algorithm further comprises:

program code for determining a lower dimensional representation for the representative news for each cluster using a deep contextualized word representation model;

wherein the program code for identifying similar clusters further comprises:

program code for determining a pairwise cosine similarity between the lower dimensional representation of the representative news of the cluster pair.

28. The computer program product of claim 27, wherein the program code further comprises:

program code for merging the cluster pair together into a merged cluster in response to the pairwise cosine similarity of the cluster pair being greater than or equal to a pre-specified threshold; and program code for re-determining the representative news of the merged cluster.

29. The computer program product of claim 28, wherein the program code for clustering the news clusters to form the set of ranked clusters further comprises:

program code for ranking news articles within each cluster sequentially by publication date and news ranking score to form the set of ranked clusters.

30. The computer program product of claim 28, wherein the program code for clustering the news clusters to form the set of ranked clusters further comprises further comprises:

program code for ranking clusters sequentially by update date, clustering ranking score, and cluster size.

31. The computer program product of claim 27, wherein the pairs of clusters are not merged if the pairwise cosine similarity of the cluster pair is less than a pre-specified threshold.

32. The computer program product of claim 23, further comprising:

program code for identifying main entities in each article using a machine learning model that independently derives features from a title, a description, and a content of each article, wherein identifying the main entities includes:

phrase matching of the title to identify one or more main entities; and natural language processing of the description and content to identify the one or more main entities, including n-gram modeling that counts a number of tokens that match with each n-gram of an entity name, and then weighs the counts exponentially; and prior to clustering the news articles, using an artificial intelligence system to remove irrelevant news articles based on a relevance of an article to one or more main entities identified in the article.

33. The computer program product of claim 23, further comprising:

program code for removing irrelevant news based on a popularity of the news source of the news article prior to clustering the news articles, wherein removing irrelevant news based on the popularity of the news source of the news article further comprises:

building a mapping from news sources to domains, including grouping news articles by news sources and extracting domains from uniform resource locators (URLs) of the news articles;

for each news source, sequentially looking up the domains in a database of website popularity by frequency until a match is made; and removing news articles published by news sources that rank below a popularity threshold in the database of website popularity.

* * * * *